US012600182B2

(12) United States Patent
Stout et al.

(10) Patent No.: US 12,600,182 B2
(45) Date of Patent: Apr. 14, 2026

(54) SELF PROPELLED TRAILER SYSTEMS

(71) Applicant: FCA US LLC, Auburn Hills, MI (US)

(72) Inventors: Mark E Stout, Waterford, MI (US);
Brandon Brady, Lapeer, MI (US);
Mac T Lynch, Waterford, MI (US);
Travis D Bechtel, Goodrich, MI (US)

(73) Assignee: FCA US LLC, Auburn Hills, MI (US)

( * ) Notice: Subject to any disclaimer, the term of this
patent is extended or adjusted under 35
U.S.C. 154(b) by 280 days.

(21) Appl. No.: 18/190,588

(22) Filed: Mar. 27, 2023

(65) Prior Publication Data

US 2024/0149914 A1 May 9, 2024

Related U.S. Application Data

(60) Provisional application No. 63/423,218, filed on Nov.
7, 2022.

(51) Int. Cl.
B60D 1/24 (2006.01)
B60D 1/145 (2006.01)
B62D 15/02 (2006.01)

(52) U.S. Cl.
CPC ............. B60D 1/249 (2013.01); B60D 1/145
(2013.01); B62D 15/021 (2013.01); *B60L*
*2200/28* (2013.01); *B60W 2300/14* (2013.01)

(58) Field of Classification Search
None
See application file for complete search history.

(56) References Cited

U.S. PATENT DOCUMENTS

| | | | | |
|---|---|---|---|---|
| 2,444,305 | A * | 6/1948 | Milhizer | B60D 1/322 |
| | | | | 280/487 |
| 4,268,199 | A * | 5/1981 | Fontrier | B60P 3/00 |
| | | | | 414/501 |
| 9,004,519 | B1 * | 4/2015 | Beech | B62D 13/06 |
| | | | | 280/442 |
| 12,202,410 | B1 * | 1/2025 | Ferone | B60R 1/26 |
| 2011/0202238 | A1 * | 8/2011 | Cebon | B62D 13/04 |
| | | | | 701/41 |
| 2014/0218522 | A1 * | 8/2014 | Lavoie | G08G 1/0962 |
| | | | | 348/148 |
| 2018/0304944 | A1 * | 10/2018 | Wright | B62D 53/08 |
| 2019/0233034 | A1 * | 8/2019 | Viele | B60D 1/36 |
| 2020/0207343 | A1 * | 7/2020 | Vassilovski | G08G 1/167 |
| 2022/0063622 | A1 * | 3/2022 | Jumpertz | G08G 1/22 |
| 2022/0126714 | A1 | 4/2022 | Bucknor et al. | |

(Continued)

*Primary Examiner* — Jennifer M Anda

(74) *Attorney, Agent, or Firm* — Jeremy J. Klobucar

(57) ABSTRACT

A trailer system with independent propulsion and control is
configured to be towed by a lead vehicle. The trailer system
includes a steerable first axle connected to a pair of first
wheels, a second axle connected to a pair of second wheels,
at least one electric traction motor configured to drive the
steerable first axle, and a high voltage battery system con-
figured to power the at least one electric traction motor. A
trailer control system (TCS) includes a controller configured
to steer, accelerate, and brake the first and/or second wheels.
A trailer sensor suite is in signal communication with the
TCS. The TCS is configured for signal communication with
a lead vehicle sensor suite, and is configured to control
driving and/or operation of the trailer system based on one
or more signals from the trailer sensor suite and the lead
vehicle sensor suite.

18 Claims, 16 Drawing Sheets

(56)     References Cited

U.S. PATENT DOCUMENTS

2022/0250618 A1 *    8/2022  Miller, Jr.  .........  B60W 50/0097
2022/0381579 A1 *  12/2022  White  ................  G01C 21/3697
2022/0410990 A1 *  12/2022  Rust  .......................  B62D 13/00
2024/0034405 A1 *    2/2024  Rust  .......................  B62D 6/003

* cited by examiner

Active Steering Axle ————
Passive Following Axle — — —
Active Following Axle ·········
Non-Steering Axle — · — · —
Ball Hitch Joint ◯

SELF PROPELLED TRAILER SYSTEMS

CROSS-REFERENCE TO RELATED APPLICATION

This application claims the benefit of U.S. Provisional Pat. App. No. 63/423,218 filed Nov. 7, 2022, the contents of which are incorporated herein by reference thereto.

FIELD

The present application relates generally to vehicle trailer systems and, more particularly, to self-propelled vehicle trailer systems.

BACKGROUND

Trailer towing is a complex task that typically requires significant driver attention and skill. When negotiating tight corners, traditional trailers tend to deviate from the path of travel of the lead vehicle by cutting inside the turning radius of the lead vehicle. This usually requires the driver of the lead vehicle to take turns wider than they would otherwise have to in order to compensate for the trailer's length. Additionally, novice drivers may naturally tend toward the right side of a lane on narrow roads for fear of collision with oncoming traffic, which can potentially put the trailer at greater risk of collision with curbside obstacles. When reversing, traditional trailers often require double reverse steering, which requires the driver to initially turn their vehicle in the opposite direction of the turn they want to make. This can cause the lead vehicle and/or trailer to swing wide of the center of the turn, thereby posing risk of collision with nearby obstacles. Moreover, trailers can potentially compromise visibility for the driver. Accordingly, while such conventional trailer systems work well for their intended purpose, there is a desire for improvement in the relevant art.

SUMMARY

In accordance with an example aspect of the invention, a trailer system with independent propulsion and control configured to be towed by a lead vehicle is provided. In one example implementation, the trailer system includes a steerable first axle connected to a pair of first wheels, a second axle connected to a pair of second wheels, at least one electric traction motor configured to drive the steerable first axle, and a high voltage battery system configured to power the at least one electric traction motor. A trailer control system (TCS) includes a controller configured to steer, accelerate, and brake the first and/or second wheels. A trailer sensor suite is in signal communication with the TCS. The TCS is configured for signal communication with a lead vehicle sensor suite, and is configured to control driving and/or operation of the trailer system based on one or more signals from the trailer sensor suite and the lead vehicle sensor suite.

In addition to the foregoing, the described trailer system may include one or more of the following: wherein the TCS includes an advanced driver assistance system (ADAS) or autonomous driving system; a tow bar system to couple the trailer system to the lead vehicle, wherein the tow bar system includes at least one angle sensor configured to sense a first angle between the lead vehicle and the tow bar system, and a second angle between the trailer system and the tow bar system; and wherein the TCS is configured to perform a forward turning maneuver of the trailer system by steering, accelerating, and/or braking the trailer system when the lead vehicle makes a forward turn.

In addition to the foregoing, the described trailer system may include one or more of the following: wherein the forward turning maneuver includes performing a delayed entry of the trailer system into the turn to avoid one or more obstacles detected by the trailer sensor suite and/or the lead vehicle sensor suite; wherein the forward turning maneuver includes performing a preemptive outside staging of the trailer system by driving the trailer system to an outside of the lead vehicle's turning path as the trailer system approaches the turn; wherein the forward turning maneuver includes real-time adjustment of a turning path of the trailer system to avoid one or more obstacles detected during the forward turning maneuver by the trailer sensor suite and/or lead vehicle sensor suite; and wherein during the forward turning maneuver, the TCS is configured to: detect, based on one or more signals from the trailer sensor suite and/or lead vehicle sensor suite, if the lead vehicle has exceeded a predetermined maximum turn angle that could result in a jackknife condition, and provide a warning to a driver of the lead vehicle when exceeding the predetermined maximum turn angle is detected.

In addition to the foregoing, the described trailer system may include one or more of the following: wherein the TCS is configured to perform a parallel offset maneuver by maintaining the trailer system at a parallel offset to the lead vehicle; wherein the TCS is configured to perform a reverse turning maneuver of the trailer system by steering, accelerating, and/or braking the trailer system when the lead vehicle makes a reverse turn; wherein during the reverse turning maneuver the TCS is configured to make steering corrections with the steerable first axle such that the lead vehicle can perform the reverse turning maneuver as if turning without the trailer system; and wherein during the reverse turning maneuver the TCS is configured to control throttle and steering of the lead vehicle.

In addition to the foregoing, the described trailer system may include one or more of the following: wherein the TCS is configured to perform a horizontal and parallel offset maneuver by maintaining the trailer system on a path horizontally offset from and parallel to a path of the lead vehicle to improve driver visibility during the reverse turning maneuver; wherein during the reverse turning maneuver, the TCS is configured to detect, based on one or more signals from the trailer sensor suite and/or lead vehicle sensor suite, if the lead vehicle has exceeded a predetermined maximum turn angle that could result in a jackknife condition, and initiate, when a jackknife condition is detected, a controlled turning of the trailer system and/or the lead vehicle to prevent the jackknife condition; and wherein the trailer sensor suite includes a trailer speed sensor, a trailer steering sensor, one or more wheel speed sensors, an accelerometer, a brake sensor, one or more blind spot monitoring/cross path sensors, one or more ultrasonic park sensors, and one or more cameras.

In accordance with another example aspect of the invention, a method is provided of controlling a trailer system with independent propulsion and control configured to be towed by a lead vehicle, the trailer system including a steerable first axle connected to a pair of first wheels, a second axle connected to a pair of second wheels, at least one electric traction motor configured to drive the steerable first axle, a high voltage battery system configured to power the at least one traction motor, a trailer control system (TCS) including a controller configured to steer, accelerate, and brake the first and/or second wheels, and a trailer sensor suite in signal communication with the TCS. The method includes monitoring, with the TCS, the trailer sensor suite; monitoring, with the TCS, a lead vehicle sensor suite; and performing, with the TCS, a forward movement maneuver or a reverse movement maneuver by steering, accelerating, and/or braking the trailer system based on one or more signals from the trailer sensor suite and/or the lead vehicle sensor suite.

In addition to the foregoing, the described method may include one or more of the following: wherein during the forward movement maneuver, the TCS is configured to perform: during a forward turn, a delayed entry of the trailer system into the turn to avoid one or more obstacles detected by the trailer sensor suite and/or the lead vehicle sensor suite; during a forward turn, a preemptive outside staging of the trailer system by driving the trailer system to an outside of the lead vehicle's turning path as the trailer system approaches the turn; during a forward turn, a real-time adjustment of a turning path of the trailer system to avoid one or more obstacles detected during the forward turn by the trailer sensor suite and/or the lead vehicle sensor suite; and during a forward turn, detecting if the lead vehicle has exceeded a predetermined maximum turn angle that could result in a jackknife condition, and providing a warning to a driver of the lead vehicle when exceeding the predetermined maximum turn angle.

In addition to the foregoing, the described method may include one or more of the following: wherein during the reverse movement maneuver, the TCS is configured to, during a reverse turn, make steering corrections with the first and/or second axle such that the lead vehicle can perform the reverse turn as if turning without the trailer system, and during a reverse turn, control throttle and steering of the lead vehicle; performing, with the TCS, a horizontal and parallel offset maneuver by maintaining the trailer system on a path horizontally offset from and parallel to a path of the lead vehicle to improve driver visibility during the forward movement maneuver or the reverse movement maneuver; and wherein the trailer system further includes a tow bar system to couple the trailer system to the lead vehicle, wherein the tow bar system includes at least one angle sensor configured to sense a first angle between the lead vehicle and the tow bar system, and a second angle between the trailer system and the tow bar system, wherein the TCS is in signal communication with the at least one angle sensor, the method further including performing, with the TCS, the forward movement maneuver or the reverse movement maneuver by steering, accelerating, and/or braking the trailer system based at least in part on one or more signals from the at least one angle sensor.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

Described herein are control systems for self-propelled, battery electric vehicle (BEV) based trailer systems. The BEV trailers may be, for example, a wagon style (e.g., wheels at four corners) or traditional chassis trailer with a steerable axle such as those shown in FIGS. 1-4. Additionally, the BEV trailers may utilize a tow bar system such as that shown and described in FIGS. 5-7. The control systems are configured to perform forward and reversing maneuvers for the BEV trailer. Forward maneuvers include delayed entry into a tight corner, preemptive outside staging in a corner, real-time adjustment of the trailer's path through a corner, driver warnings, and sustained horizontal offset between the BEV trailer and lead vehicle. Reverse maneuvers include straight-line reversing led by the BEV trailer, backing turns initiated by the BEV trailer, driver warnings, jackknife condition departure, and sustained horizontal offset between the BEV trailer and lead vehicle.

In this way, the control systems enable novice drivers to safely operate and tow a trailer through a suite of maneuvers, sensors, algorithms, and corresponding human machine interface enables the self-propelled BEV trailer to follow the path of the lead vehicle more effectively than a non-powered trailer. The additional degree of freedom provided the tow bar system allows the trailer control system to intelligently select its path of travel in a way that avoids obstacles and improves user comfort. Example trailer systems are described in FIGS. 1-7. Self-powered BEV trailer control systems and methods are described in FIGS. 8-15.

Figure 1:
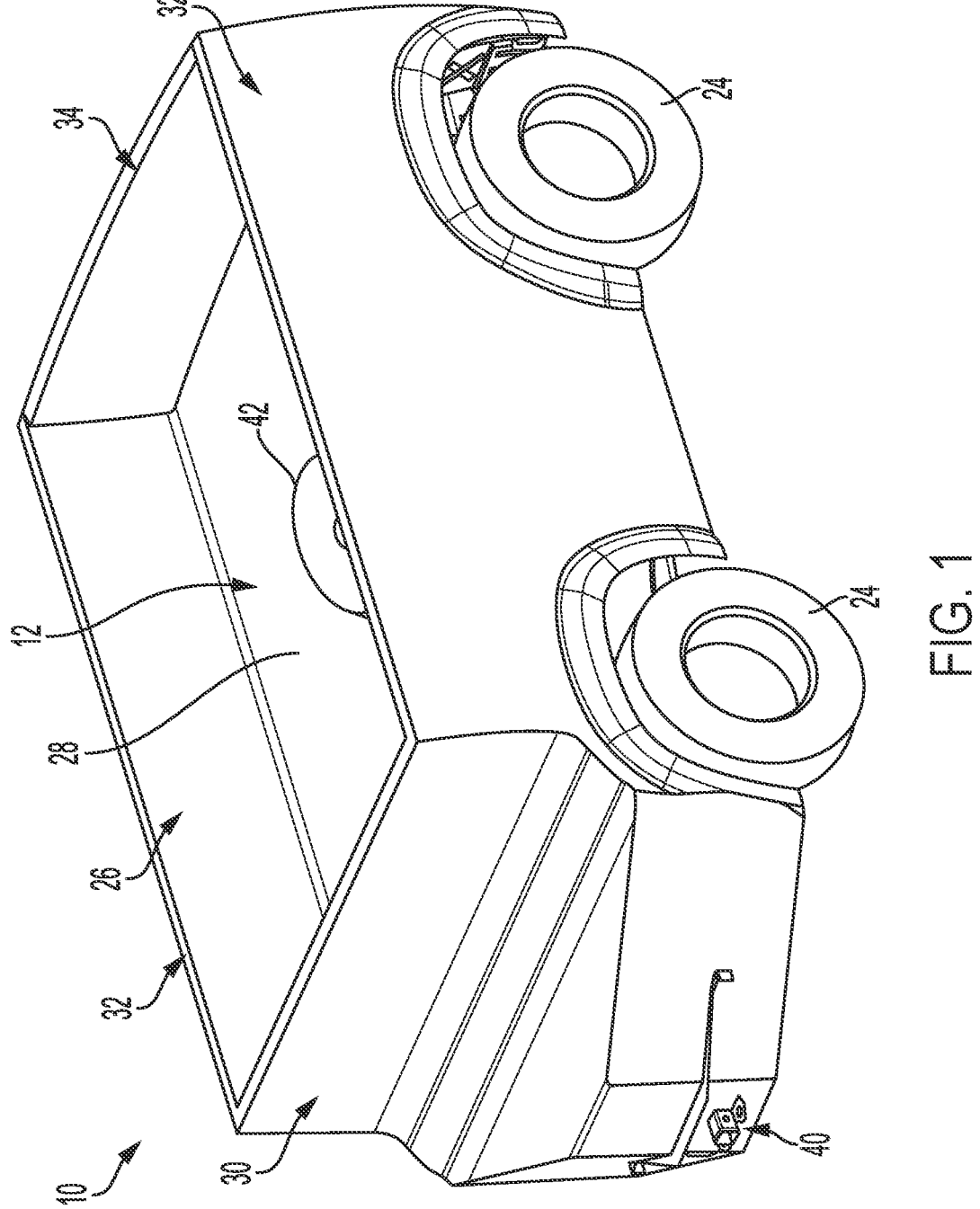
FIG. 1 is a perspective view of an example dolly platform system with independent propulsion and control, in accordance with the principles of the present application.
Figure 2:
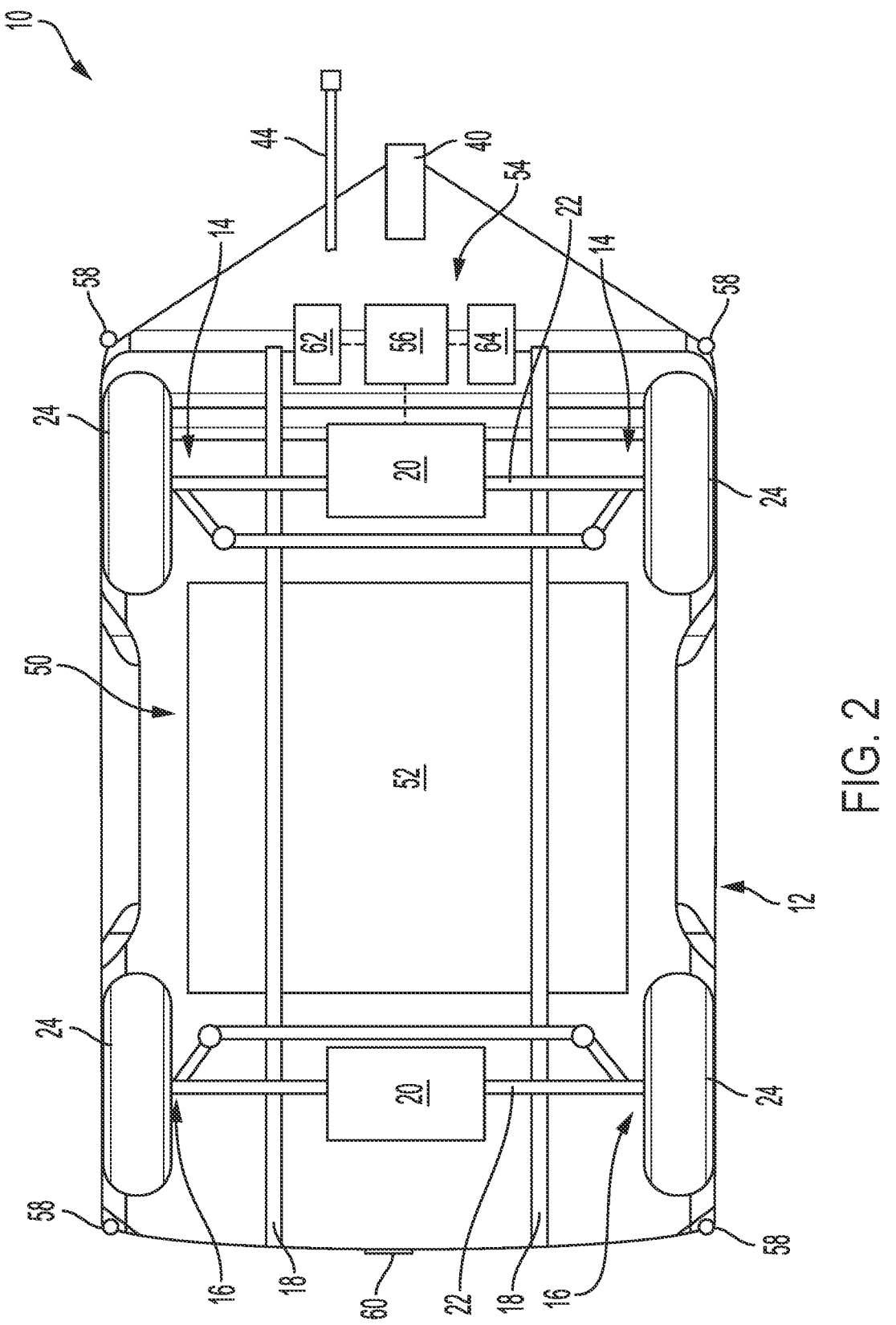
FIG. 2 is a bottom view of the dolly platform system shown in FIG. 1, in accordance with the principles of the present application.

With reference now to FIGS. 1 and 2, the trailer support-ing dolly system with independent propulsion and control will be describe in more detail. In some examples, the trailer-supporting dolly system is an auxiliary power dolly that enables small vehicles to tow a trailer such as a gooseneck, fifth wheel, or traditional bumper-pull trailer. The dolly system provides the motive force and energy needed to tow a trailer via an electrified powertrain and batteries. The dolly system attaches to the lead vehicle via a tow bar and supports heavier loads and taller hitch height of a trailer that is specifically designed for trucks with in-bed connections (e.g., fifth wheel, gooseneck). The dolly system functions as a steering axle for the trailer to control its motion via steer-by-wire, and allows separate low-speed remote maneuvering for parking in confined spaces such as parking lots, campgrounds or charging stations.

The dolly system includes suspension (rate and travel) similar to the rear axle of one-ton DRW trucks or enclosed cargo vans. This provides the dolly system with its own ground force reactions for steering, acceleration, and brak-ing to manage loading into the trailer hitch structure similar to "free pivot" designs. The dolly system can also include modular functionality greater than a pickup truck with a bed. For example, the dolly system can include a dump bed with modular side panels that transition between a flat bed and a walled-in bed depending on the cargo. The walled-in bed can include conventional bed sides/walls and a cover for typical truck bed usage. Because the dolly system can be remotely maneuvered at low speeds, the system is highly maneuver-able for utility uses such as dumping mulch, collecting/moving firewood, waste/dumpster disposal, etc.

In the example embodiments, the dolly system is config-ured to support the weight of any type of trailer hitch and acts as an intermediary between the lead vehicle and the trailer. The intermediate body creates backwards compat-ibility between EVs and older trailers without their own power source. Onboard batteries improve range of the EV/trailer, and allow a smaller lead vehicle to tow a large trailer by handling most or all of the braking and acceler-ating. The front steering axle pulls the trailer around corners and allows it to accurately follow the lead vehicle path. A low-speed remote maneuvering function allows the trailer to steer into tight spaces with ease. The dolly system's truck bed sides and small size allow users to experience the functionality and utility of a truck only when they need it, allowing them to own a smaller, cheaper, and more fuel efficient vehicle that suits daily use needs.

The dolly system described herein advantageously pro-vides backwards compatibility for EVs to pull older trailers, does not require users to purchase a new trailer in order to maintain towing range, and allows the driver to steer the trailer much more easily than a conventional trailer because of the active steering axle. The system also provides more control than the passive steering axle of an automated safety hitch, and allows a much smaller vehicle to tow/lead the trailer because of the stability of its four-wheeled chassis and electrified powertrain. As such, the dolly system does all the work of braking, accelerating and steering of the trailer, leaving the lead vehicle to simply be a guide.

With continued reference to FIGS. 1 and 2, a trailer-supporting tug/dolly platform system 10 with independent and autonomous propulsion and control is illustrated. The dolly system 10 advantageously provides a non-powered trailer with a powered trailer having autonomous steering capabilities. The dolly system 10 includes a load platform 12 located above and supported by a front suspension 14, a rear suspension 16, and a frame or chassis 18. The dolly system 10 includes an electric powertrain having one or more electric traction motors 20 that generate and transfer torque to one or more steerable axles 22 and wheels 24 via intermediate components (e.g., a transmission, shafts, dif-ferential). The electric traction motor(s) 20 are electrically coupled to and powered by a high voltage battery system 50 having one or more battery packs or modules 52, as described herein in more detail.

In one exemplary implementation, the dolly system 10 is similar to a pickup truck bed, as illustrated. The load platform 12 provides a truck bed or cargo area 26 defined at least partially by a floor 28, a forward wall 30, side walls 32, and a tailgate 34. One or more of the forward wall 30, side walls 32, and tailgate 34 may be removable to transition the dolly system 10 into various configurations for towing and/or cargo hauling. Moreover, the load platform 12 may be articulatable to function as a dump bed.

In the example embodiment, the dolly system 10 includes a lead vehicle hitch connection 40, a trailer hitch structure 42, and a high voltage power connection 44. The lead vehicle hitch connection 40 is configured for removable coupling with a lead vehicle (not shown), for example via the tow bar system 200 described herein. The trailer hitch structure 42 is coupled to the floor 28 and configured to removably couple to a trailer (not shown) such as a fifth wheel or gooseneck trailer. The high voltage power connec-tion 44 is configured to electrically couple to a correspond-ing connection of the lead vehicle (not shown). The high voltage connection 44 is electrically coupled to the battery pack(s) 52 to enable power connection between the dolly system 10 and the lead vehicle. In this way, battery charge can be shared or redirected between the electric dolly system 10 and an electric lead vehicle.

As shown in FIG. 2, the dolly system 10 includes an advanced driver assistance system (ADAS)/autonomous driving system 54 that generally includes a controller 56, one or more sensors 58, one or more cameras 60, a steer-by-wire control module 62, and one or more actuators 64. The controller 56 is configured to control operation of the dolly system 10 as well as execute at least one ADAS/autonomous driving feature. The sensors 58 and cameras 60 are configured to capture/measure data utilized by the ADAS/autonomous driving system 54 to control the dolly system 10. The steer-by-wire control module 62 is config-ured to operate the actuators 64 to control driving/operation of the dolly system 10 as part of the ADAS/autonomous driving feature. In this way, the controller 56 is configured to control the electric traction motor(s) 20 and the steerable axle(s) 22 and can be configured for autonomous or manual control of the dolly system 10. Moreover, the controller 56 or other components (e.g., sensors 58, cameras 60) of the ADAS/autonomous driving system 54 may be in signal communication with the lead vehicle (e.g., via electrical connection, wireless, CAN bus, lead vehicle ADAS system, etc.) for cooperative and integrated operation between the dolly system 10 and lead vehicle.

In operation, the dolly system 10 provides motive force and power to tow a trailer via an electrified powertrain and HV battery system 50, including independently performing some or all braking and acceleration of the trailer. This reduces or eliminates power demands on the towing vehicle for acceleration and braking, which allows a smaller vehicle to tow a larger trailer, since the dolly system 10 can balance itself and is not dependent on the towing vehicle to carry significant trailer tongue weight. The dolly system 10 supports the heavier loads and taller hitch height of a trailer specifically designed for trucks with in-bed connections. Advantageously, the dolly system 10 includes its own suspension 14, 16 to provide its own ground force reactions for steering, acceleration and braking to manage loading in the trailer hitch structure. Moreover, the ADAS/autonomous driving system 54, including the steer-by-wire control module 62, is utilized to control the steering axle(s) 22 to provide and control its own motion of the attached trailer. Additionally, the dolly system 10 can be controlled (e.g., driven) in a low-speed remote maneuvering mode via a control unit (not shown) such as, for example, a user interface in the towing vehicle, a user interface on the dolly system, a smart phone app, etc. This is particularly useful for parking in tight confines such as parking spaces, charging stations, camping sites, etc.

Figures 3, 4:
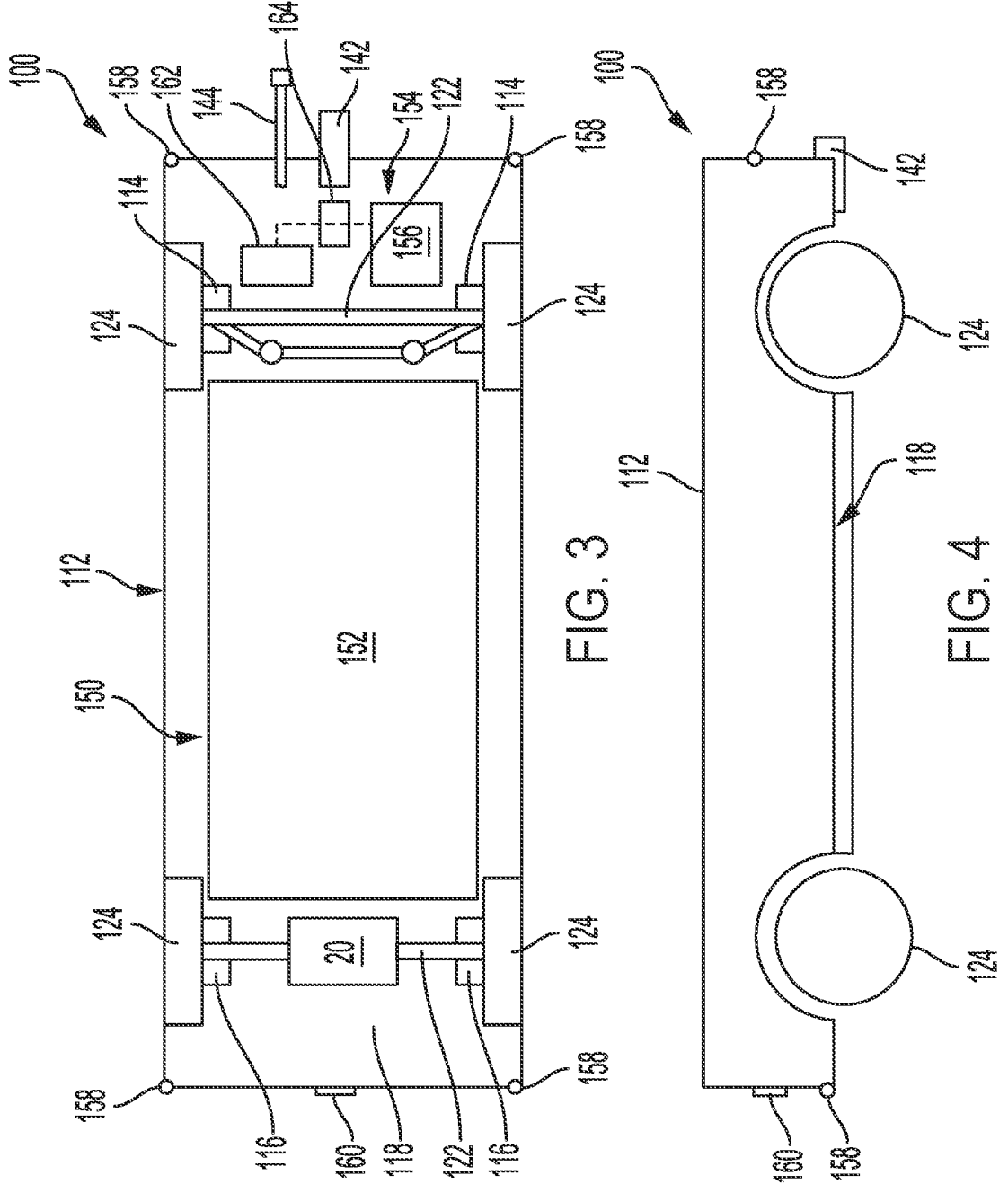
FIG. 3 is a bottom view of an example trailer platform system in accordance with the principles of the present application.
FIG. 4 is a side view of the trailer platform system shown in FIG. 3, in accordance with the principles of the present application.

With reference now to FIGS. 3 and 4, the trailer platform system with independent propulsion and control will be described in more detail. In some examples, the trailer platform system is a self-propelled battery electric vehicle (BEV) based, wagon style (e.g., wheel at four corners) trailer, with autonomous driving control capability. The trailer platform system generally includes a chassis, wheels, tires, suspension, brakes, a battery pack, electric drive motor(s), control modules (e.g., controllers), a steer-by-wire system, camera(s), and/or sensor(s). The system operates by interacting with some or all of the following components on the lead vehicle: vehicle CAN bus, trailer hitch load cell, vehicle dynamics control module(s), and autonomous sensors and ADAS control module(s). The system is also configured to share battery charge between the lead vehicle and the trailer platform.

In the example embodiment, the trailer platform system provides the motive force and energy needed to tow a trailer via an electrified powertrain and batteries. The system attaches to the lead vehicle (e.g., through a wireless or wired connection and a tow bar) and is configured to support its own weight. The trailer includes a steering axle to control its motion via steer-by-wire and allows separate low-speed remote maneuvering. The trailer system includes a suspension (rate and travel) similar to the rear axle of a one-ton DRW truck or enclosed cargo van to provide its own ground force reactions for steering, acceleration and braking, to thereby manage loading and clearance to the lead vehicle. In one example, with a highly autonomous lead vehicle, the lead vehicle can control the trailer remotely to the autonomy level, and associated cost and weight of the trailer can be reduced by eliminating the ADAS sensors and controllers from the trailer.

In some examples, the included battery pack, motor(s), and controller(s) are sized to reduce or eliminate power demands on the lead vehicle for acceleration and braking. The wagon style trailer setup (with wheels at the four corners of the trailer instead of near the middle of the trailer length for traditional towed trailers) will allow a smaller vehicle to tow a larger trailer, since the trailer can balance itself and is not dependent on the lead vehicle to carry significant trailer tongue weight. The dynamic steering and propulsion/braking capability allows the trailer to correct the trailer's path when turning while moving in forward or reverse to follow the lead vehicles intended path more closely than traditional trailers. This can also allow for trailer obstacle avoidance and enhanced trailer stability control.

The trailer platform system advantageously provides autonomous dynamic control (e.g., acceleration, braking, steering) to a trailer, controlled either through self-contained systems or communication with lead vehicle autonomous systems. The wagon-style chassis can be used in light and medium duty trailer categories for on-road use. The actively steered axle allows greater steering control and the ability to reverse as compared to low-speed farm/utility wagons.

With continued reference to FIGS. 3 and 4, a trailer platform system 100 with independent and autonomous propulsion and control is illustrated. The trailer platform system 100 includes a load platform 112 located above and supported by a front suspension 114, a rear suspension 116, and a frame or chassis 118. The trailer platform system 100 includes an electric powertrain having one or more electric traction motors 120 that generate and transfer torque to one or more steerable axles 122 and wheels 124 via intermediate components (e.g., a transmission, shafts, differential). The electric traction motor(s) 120 are electrically coupled to and powered by a high voltage battery system 150 having one or more battery packs or modules 152. As illustrated, in the example embodiment, the wheels 124 are located at the four corners of the trailer instead of near the middle of the trailer length.

In the example embodiment, the trailer platform system 100 includes a lead vehicle hitch connection 142 and a high voltage power connection 144. The hitch connection 142 is coupled to the chassis 118 and is configured for removable coupling with a lead vehicle (not shown), for example via the tow bar system 200 described herein. The high voltage power connection 144 is configured to electrically couple to a corresponding high voltage connection of the lead vehicle (not shown). The high voltage power connection 144 is electrically coupled to the battery pack(s) 152 to enable power connection between the trailer platform system 100 and the lead vehicle. In this way, battery charge can be shared or redirected between the electrically driven trailer platform system 100 and an electric lead vehicle.

As shown in FIG. 3, the trailer platform system 100 includes an advanced driver assistance system (ADAS)/autonomous driving system 154 that generally includes a controller 156 (e.g., PCM), one or more sensors 158, one or more cameras 160, a steer-by-wire control module 162, and one or more actuators 164. The controller 156 is configured to control operation of the trailer platform system 100 as well as execute at least one ADAS/autonomous driving feature. The sensors 158 and cameras 160 are configured to capture/measure data utilized by the ADAS/autonomous driving system 154 to control the trailer platform system 100. The steer-by-wire control module 162 is configured to operate the actuators 164 to control driving/operation of the trailer platform system 100 as part of the ADAS/autonomous driving feature. In this way, the controller 156 is configured to control the electric motor(s) 120 and the steerable axle(s) 122 and can be configured for autonomous or manual control of the trailer platform system 100. Moreover, the controller 156 or other components (e.g., sensors 158, cameras 160) of the ADAS/autonomous driving system 154 may be in signal communication with the lead vehicle (e.g., via electrical connection, wireless connection, CAN bus, lead vehicle ADAS system, etc.) for cooperative and integrated operation between the trailer platform system 100 and lead vehicle.

In operation, the trailer platform system 100 provides motive force and power to tow a trailer via an electrified powertrain and HV battery system 150, including independently performing some or all braking and acceleration of the trailer. This reduces or eliminates power demands on the towing vehicle for acceleration and braking, which allows a smaller vehicle to tow a larger trailer, since the trailer platform system 100 can balance itself and is not dependent on the towing vehicle to carry significant trailer tongue weight. Advantageously, the trailer platform system 100 includes its own suspension 114, 116 to provide its own ground force reactions for steering, acceleration and braking to manage loading in the trailer hitch structure. Moreover, the ADAS/autonomous driving system 154, including the steer-by-wire control module 162, is utilized to control the steering axle(s) 122 to provide and control its own trailer motion. Additionally, the trailer platform system 100 can be controlled (e.g., driven) in a low-speed remote maneuvering mode via a control unit (not shown) such as, for example, a user interface in the towing vehicle, a user interface on the trailer platform system, a smart phone app, etc. This is particularly useful for parking in tight confines such as parking spaces, charging stations, camping sites, etc.

Figures 5, 6:
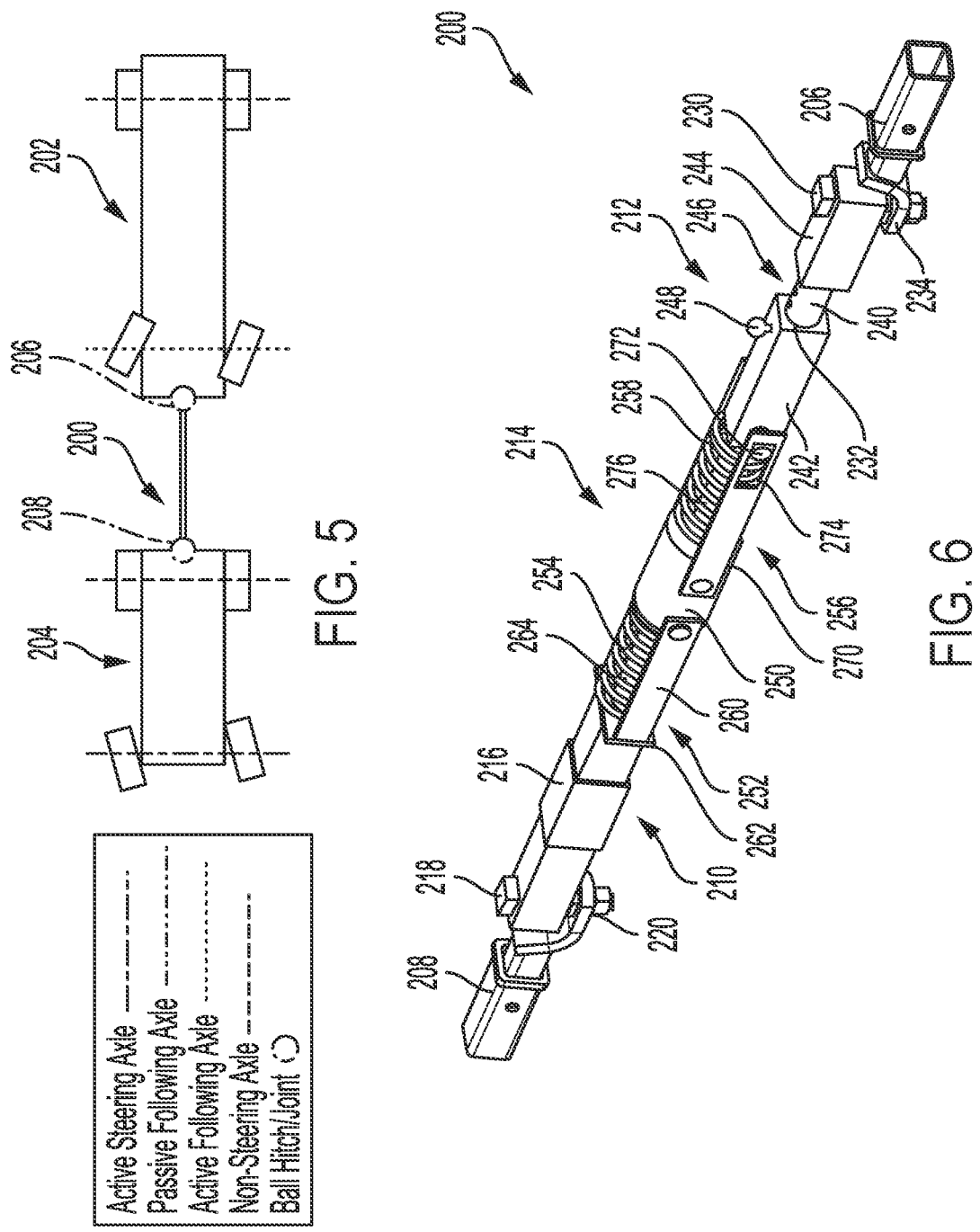
FIG. 5 is a schematic illustration of an example tow bar system connecting a lead vehicle and a trailing vehicle, in accordance with the principles of the present application.
FIG. 6 is a perspective view of the example tow bar system shown in FIG. 5, in accordance with the principles of the present application.
Figure 7:
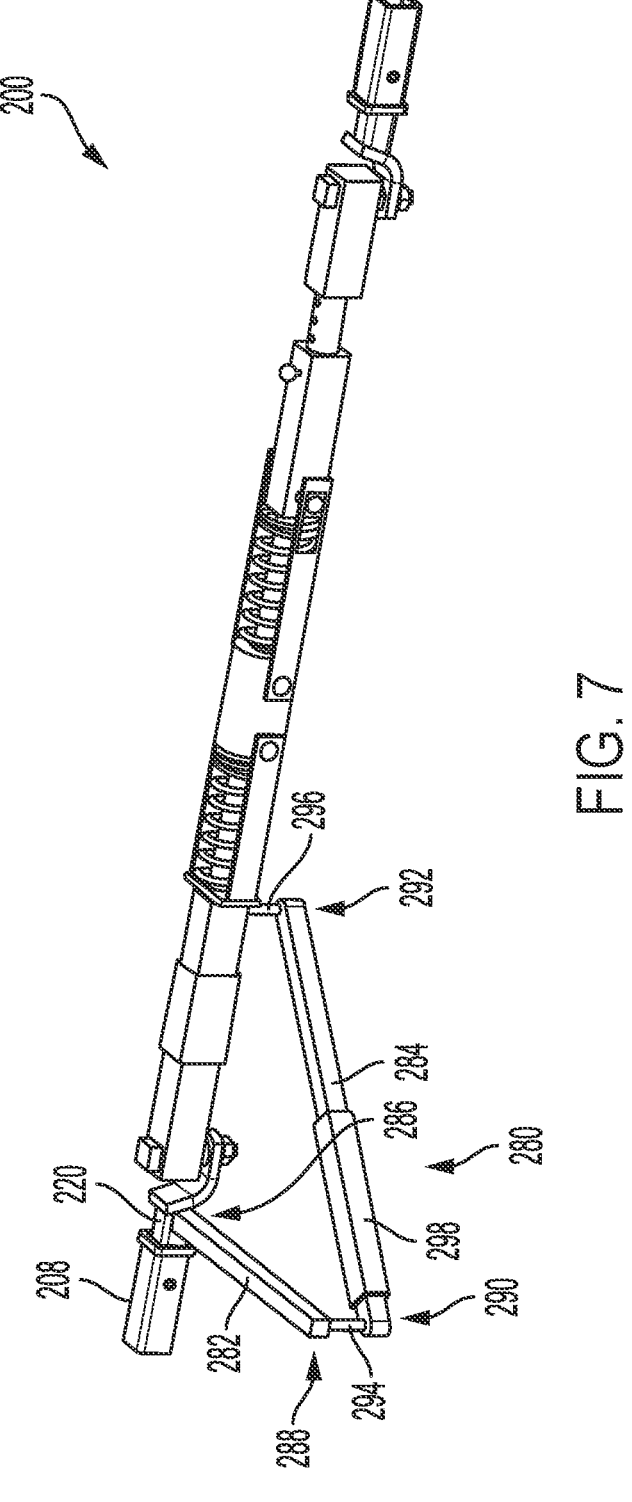
FIG. 7 is a perspective view of the example tow bar system shown in FIG. 6 with an example horizontal lockout assembly, in accordance with the principles of the present application.

With reference now to FIGS. 5-7, the tow bar system will be described in more detail. In some examples, the tow bar system is configured for independently steered and powered trailers and includes: (a) a five degree of freedom connection at both ends of the tow bar to allow articulation between the two vehicles, (b) a means of adjusting the length of the bar between the lead and follow vehicles, (c) a means of locking the adjusted length after the connection has been made between the vehicles, (d) a means to absorb harsh compressive loads that could occur while braking or steering, (e) a means to absorb harsh tensile loads that could occur while accelerating or steering, (f) a means to support and route an electrical cable connection between the lead and follow vehicles, (g) an optional means to sense angular difference between the tow bar and either one or both lead and follow vehicle, (h) a means of sensing tensile and compressive loads in the tow bar, and/or (i) an optional means to lockout the lateral steering degree of freedom at one end of the tow bar. The mechanical assembly is configured to attach between the rear trailer towing connection of the lead vehicle and a front/center towing connection like a typical rear towing connection.

The tow bar system provides a physical linkage between two vehicles that have the independent ability to accelerate and decelerate (fore/aft) via human or autonomous control, and steer laterally via human or autonomous driving control. The system provides additional degrees of freedom as a link between the two vehicles to allow improved articulation between the leading and following vehicles, leaving only a tension/compression load and nominal length constraint. The system does not support vertical loading between the two vehicles, so no weight is transferred therebetween and having a negative effect on the handling of them individually or as a pair. The system also does not transfer lateral moment loading between the vehicles unless a tensile or compressive load is created by a speed differential between the vehicle attachment points. This feature will eliminate any possibility of the following vehicle imparting trailer sway to the lead vehicle, and allow the lead and follow vehicles to maintain an offset within the lane width when it may be advantageous for crosswind drag or visibility in outside lanes. As such, the tow bar system allows vehicles that may be mismatched in terms of turning radius (e.g., due to differences in wheelbase) to follow in a best fit path via independent physical, but electronically linked steering, acceleration, and braking controls.

Additionally, the tow bar system advantageously provides one or more of the following optional benefits over conventional trailer attachment: (a) additional angular tolerance for the connection eliminates the need for jacking or height adjustments on flat or angled ground; (b) optional selectable length adjustment combined with feature (a) eliminates the need for a precise distance between the two vehicles; (c) once the mechanical connections have been made the nominal length will be set and locked at the bar, or by moving one of the vehicles to the next locking point; (d) allowing for some compression travel within the tow bar will allow for latency between the lead vehicle initiating a braking event before the following vehicle can respond precisely. A relatively small amount of compressive travel will reduce the load on the two bar and any shock or bump that might be felt by the vehicle occupants; (e) allowing some extension travel provides the same benefits as feature (d) for acceleration and can also be used if it is desirable for the following vehicle to have a higher braking power to keep the connection in-line with the lead vehicle; (f) the structure of the tow bar can serve as a support for communications and power transfer harnesses between the lead and follow vehicles, though a wired connection may not be required if wireless technology is used; (g) optional measurement of the angle of the tow bar to the lead and follow vehicles could be used as a primary or back-up sensing to the onboard electronics of the lead and/or follow vehicles, while sensing angle directly at the tow bar can prevent jackknife/contact events while making low speed maneuvers in forward or reverse; (h) sensing the tensile and compressive loading present in the tow bar can provide a primary or secondary means of balancing or targeting a desired force during acceleration, cruising at steady speed and braking forces between the two vehicles; and (i) optional ability to lock the lateral pivoting of the tow bar at one end, which allows for the recovery of a following vehicle that may not have lost electrical power to maintain its independent steering operation or may have reduced braking performance. The lock could be set manually or while driving if a loss of power or function is detected.

In some examples, the tow bar system advantageously provides: spherical degrees of freedom at both ends of the tow bar, which allows active steering of the trailing vehicle, as opposed to flat towing where the front wheels of the tow vehicle must follow the path dictated by a rigid tow bar. The system also includes a powered trailer, which allows reversing maneuvers that are not possible with flat towing. Steering of the trailer is controlled electronically, allowing reverse movement without jackknifing, and left-right bias relative to the lead vehicle. The system supplies all or most of the pulling power needed to move the trailer with any lead vehicle, as enabled by a load cell in the tow bar. The system is a simply supported beam connection so the lead vehicle does not have to support the trailer's weight.

With continued reference to FIGS. 5-7, a tow bar system 200 for independently steered and powered trailers is illustrated. As shown in FIG. 5, the tow bar system 200 is configured to removably couple a trailing vehicle 202 (e.g., a trailer) to a lead vehicle 204. The trailing vehicle 202 includes a hitch receiver 206, and the lead vehicle includes a hitch receiver 208. As shown in FIG. 6, the tow bar system 200 generally includes a front tow bar 210 and a rear tow bar 212 coupled by a damper system 214. The tow bar system 200 is configured to support and route an electrical cable connection (not shown) between the lead and follow/tow vehicles, for example to provide signal communication (e.g., from sensors, cameras, etc.) or shared high voltage therebetween.

In the example embodiment, the front tow bar 210 is configured to removably couple to a hitch 220 received by the lead vehicle hitch receiver 208. As illustrated, the front tow bar 210 includes a load cell 216 and an angle sensor 218. The load cell 216 is configured to sense various forces on the tow bar system 200 including a trailer tongue weight, tension, and compression. The angle sensor 218 is configured to sense an angle between the lead vehicle 204 and a longitudinal axis of the front tow bar 210. The load cell 216 and the angle sensor 218 are in signal communication (e.g., wired, wireless) with a controller of the lead vehicle 204 and/or the trailing vehicle 202 (e.g., dolly system 10, trailer platform system 100). Such controllers may be part of an ADAS/automated driving system for that particular vehicle and utilize signals from the load cell 216 and angle sensor 218 to control one or more operations of the vehicles 202, 204.

The rear tow bar 212 is configured to removably couple to a hitch 234 received by the trailing vehicle hitch receiver 206. The rear tow bar 212 includes an angle sensor 230 and a length adjustment and locking mechanism 232. The angle sensor 230 is configured to sense an angle between the trailing vehicle 202 and the longitudinal axis of the rear tow bar 212. The angle sensor 230 is in signal communication (e.g., wired, wireless) with a controller of the lead vehicle 204 and/or the trailing vehicle 202 (e.g., dolly system 10, trailer platform system 100). Such controllers may be part of an ADAS/automated driving system for that particular vehicle and utilize signals from the angle sensor 230 to control one or more operations of the vehicles 202, 204.

In the example embodiment, the length adjustment and locking mechanism 232 generally includes a locking bar 240 extending between a forward bar 242 and a rearward bar 244. The locking bar 240 is rigidly coupled to the rearward bar 244 and is slidingly received within the forward bar 242. The locking bar 240 includes a plurality of axially spaced apertures 246 configured to selectively receive a pin 248 therein to lock-in the relative distance between the forward bar 242 and the rearward bar 244. The pin 248 is removable to allow sliding adjustment of the locking bar 240 to establish a desired length of the rear tow bar 212. It will be appreciated however that rear tow bar 212 may have any suitable alternative configuration that enables length adjustment of the rear tow bar 212, and such a length adjustment system may additionally or alternatively be utilized with the front tow bar 210.

In the example implementation, the damper system 214 is disposed between the front tow bar 210 and the rear tow bar 212 and generally includes a damper 250, a front support 252, a front biasing mechanism 254 (e.g., a spring), a rear support 256, and a rear biasing mechanism 258 (e.g., a spring).

The front support 252 includes a pair of spaced apart support bars or members 260 with first ends coupled to an end plate 262, and opposite second ends coupled to the damper 250. The end plate 262 is coupled to and/or disposed against the front tow bar 210. The front biasing mechanism 254 is disposed about a front guide post 264 and positioned between the end plate 262 and the damper 250. The front guide post 264 is integral with or rigidly coupled to the front tow bar 210 and extends through an aperture formed in the end plate 262. In one example embodiment, the front biasing mechanism 254 is an extension spring configured to bias the front tow bar 210 and damper 250 towards each other, and absorb tensile forces in the tow bar system 200. The damper 250 is a generally cylindrical damping member fabricated from a suitable damping material configured to absorb forces (e.g., tension, compression) experienced in the tow bar system 200 during towing operations.

The rear support 256 includes a pair of spaced apart support bars or members 270 with first ends coupled to the damper 250, and opposite second ends coupled to the rear tow bar 212, for example, via the illustrated pins 272. The second end of each support member 270 includes a window 274 configured to slidingly receive pin 272. In this way, pins 272 are configured to translate fore/aft within the windows 274. The rear biasing mechanism 258 is disposed about a rear guide post 276 and positioned between the damper 250 and the rear tow bar 212. The rear guide post 276 is integral with or rigidly coupled to the rear tow bar 212. In one example embodiment, the rear biasing mechanism 258 is a compression spring configured to bias apart the damper 250 and rear tow bar 212 and absorb compressive forces in the tow bar system 200.

FIG. 7 illustrates the tow bar system 200 with a horizontal lockout assembly 280 configured to lock out the lateral steering degree of freedom at one end of the tow bar if steering control is lost on the trailing vehicle 202. In this way, the horizontal lockout assembly 280 is configured to turn the tow bar system 200 into a rigid tow bar to prevent loss of lateral control.

In the example embodiment, the horizontal lockout assembly 280 generally includes a horizontal bar or member 282 and an angled bar or member 284. The horizontal member 282 includes a first end 286 coupled to the hitch 220 and an opposite second end 288. The angled member 284 includes a first end 290 and an opposite second end 292. The first end 290 is pivotally coupled to the horizontal member second end 288 via a pin 294, and the second end 292 is pivotally coupled to the front tow bar 210 via a pin 296. The angled member 284 includes a sliding joint 298 that enables a length of the angled member 284 to change to allow a full range of articulation of the tow bar system 200. If there is a loss of power and/or communication with the trailing vehicle 202, the sliding joint 298 is configured to lock and prevent loss of lateral control of the trailing vehicle 202.

In operation, the tow bar system 200 is configured to absorb harsh tensile and compressive loads that occur while steering, braking, and accelerating. Moreover, the length of tow bar system 200 is adjustable via the length adjustment and locking mechanism 232. The various sensors included with tow bar system 200 enable sensing of tensile/compressive loads as well as the angular difference between the tow bar and the lead and follow vehicles. This enables a self-powered, steering capable follow vehicle (e.g., dolly system 10, trailer platform system 100) to accelerate/decelerate, brake, and steer via human or autonomous control. As such, the tow bar system 200 enables a vehicle/trailer that may be mismatched in terms of turning radius to follow in a best fit path via independent physical, electronically linked steering, acceleration, and braking controls.

Figure 8:
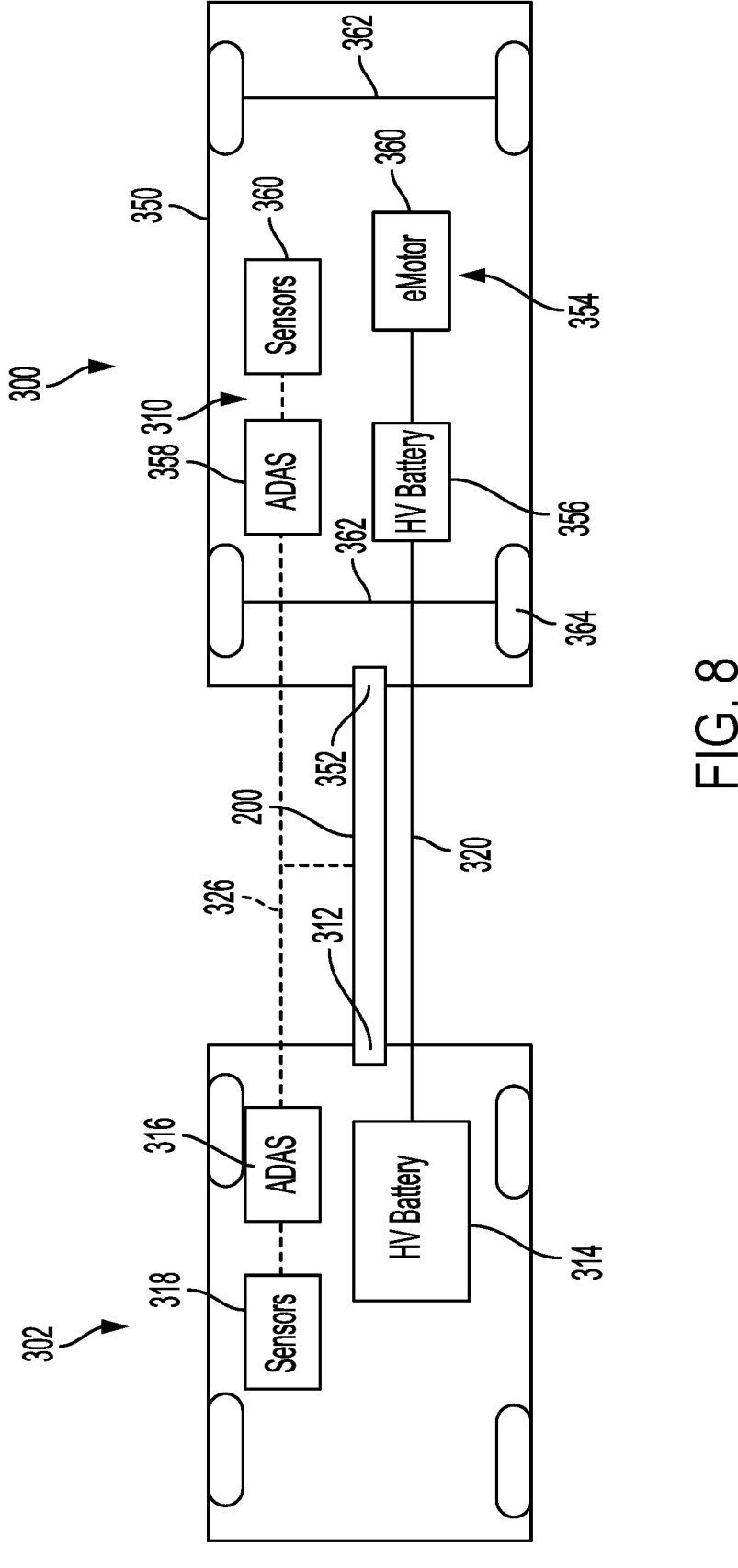
FIG. 8 is a schematic illustration of a lead vehicle and self-powered trailer with a trailer control system in accordance with the principles of the present application.

With reference now to FIG. 8, a control system for a self-propelled trailer will be described in more detail. The trailer control system is configured to make towing easier by automatically optimizing the path of the trailer to accurately follow the lead vehicle. The maneuvering capability of a self-propelled trailer with a steerable axle (e.g., trailer systems 10, 100) along with a tow bar system (e.g., tow bar system 200) enables the trailer to adjust its path of travel in tight corners by traveling deeper into the corner or moving farther outside of the corner. The trailer control system also enables the trailer to correct mistakes that novice drivers may make such as failing to travel far enough out into an intersection before starting a turn.

In this way, the trailer control system enables the trailer to respond to its environment and change its direction of travel dynamically, for example, if obstacles (e.g., vehicles, pedestrians) appear during trailering maneuvers. Moreover, the trailer control system enables the trailer to move relative to the lead vehicle while still remaining attached thereto. To perform such operations, the trailer control system includes ADAS sensing capability through its own sensor system and/or the sensor system of a lead vehicle.

The trailer control system also enables the trailer to bias horizontally from the lead vehicle and travel in a straight line parallel to the lead vehicle, which enables better visibility and crosswind performance at highway speeds, as well as lane centering in urban environments. Directional control of the trailer can further be accomplished by sensors in the tow bar system such as, for example, angle sensors at one or both ends of the tow bar where pivoting occurs, a linear accelerometer or displacement sensor to measure relative acceleration of the lead vehicle and trailer, and force sensors to measure tension/compression loads between the lead vehicle and trailer. Additionally, CAN signals such as wheel speed, steering angle, and throttle/steering command may be shared between the lead vehicle and the trailer control system.

The trailer control system also improves maneuvering the lead vehicle and trailer in reverse by eliminating the need for the driver to make complex double reverse steering maneuvers to initiate a turn. In operation, the trailer's own steering axle(s) respond to steering control inputs of the lead vehicle and initiate the turn itself. In some operations, the lead vehicle only needs to maneuver to follow the trailer around the turn, thereby enabling improved lane keeping and decreasing the risk of collision with obstacles that may be encountered while reversing or parking. Additionally, with the tow bar system described herein, the trailer control system enables the lead vehicle to offset horizontally from the trailer while reversing, thereby improving visibility, for example when backing up toward boat launches or into tight parking spots.

With continued reference to FIG. 8, a self-propelled trailer system 300 is shown operably coupled to a lead vehicle 302 via tow bar system 200 (shown in FIGS. 5-7). In the example embodiment, trailer system 300 includes a trailer control system (TCS) 310 configured for signal communication with the lead vehicle 302 and/or tow bar system 200 to perform various trailering maneuvers, as described herein in more detail. Although, it will be appreciated that TCS 310 is capable of performing the trailering maneuvers without signal communication with the lead vehicle 302 and tow bar system 200.

The lead vehicle 302 may be any suitable towing vehicle. However, in the illustrated example, lead vehicle 302 generally includes a trailer hitch 312, a high voltage battery system 314, and an ADAS/autonomous driving system 316 operably connected to a sensor suite 318. The trailer hitch 312 is configured to removably couple to the tow bar system 200 or directly to the trailer system 300. The high voltage battery system 314 is configured to power one or more electric traction motors (not shown) of the lead vehicle 302. A high voltage connection 320 is configured to electrically couple the high voltage battery system 314 with the self-powered trailer system 300, for example, to provide bi-directional charging therebetween.

Figure 9:
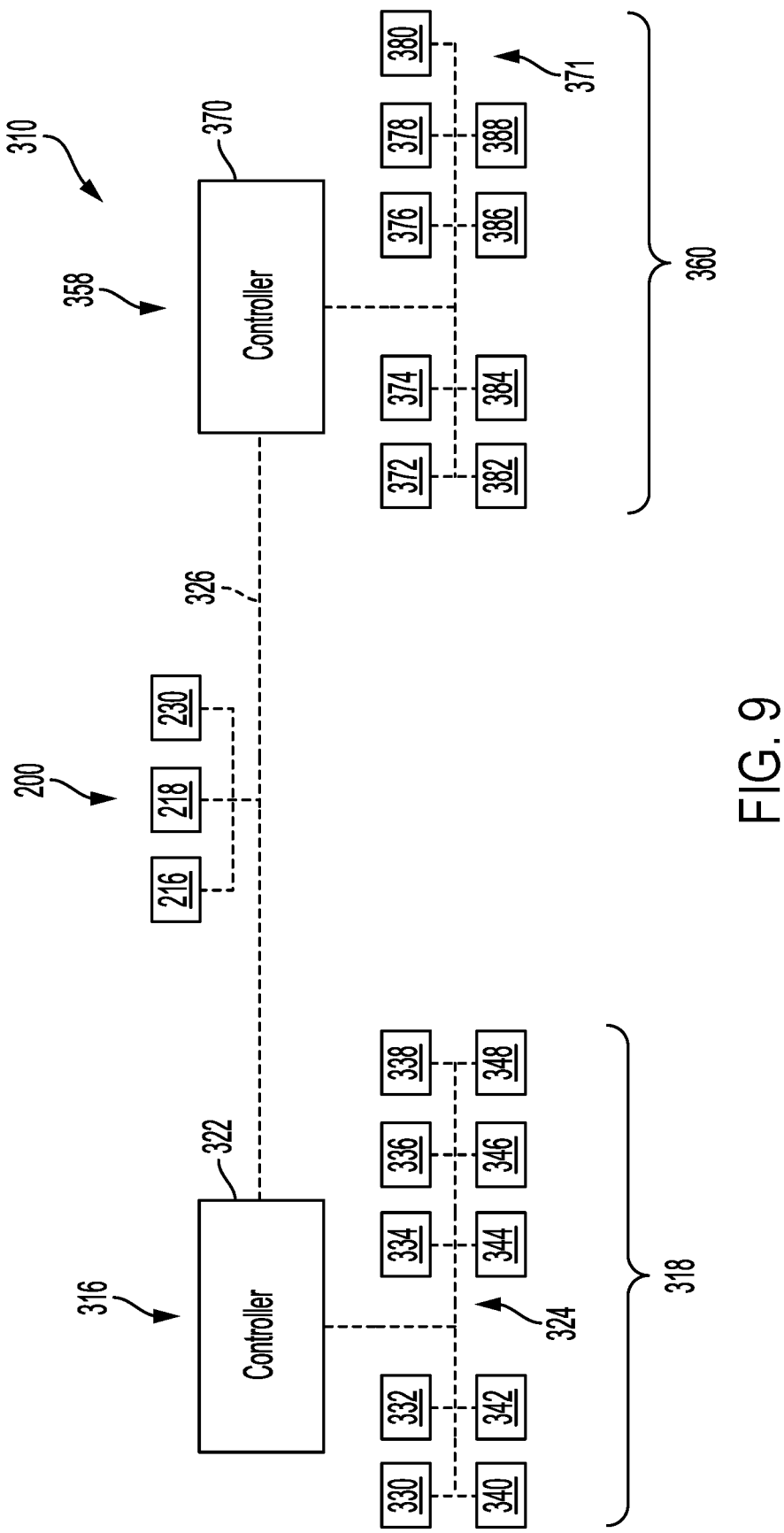
FIG. 9 is a schematic illustration of the trailer control system in accordance with the principles of the present application.

With additional reference to FIG. 9, in the example embodiment, the ADAS/autonomous driving system 316 includes a controller 322 in signal communication with the sensor suite 318, for example, via a CAN bus 324. The ADAS/autonomous driving system 316 is further in signal communication with the tow bar system 200 and/or trailer system 300 via a wired or wireless connection 326. As shown in FIG. 6, the tow bar system 200 includes angle sensors 218, 230 configured to sense an angle between the tow bar system 200 and the lead vehicle 302 and/or trailer system 300, as well as a load cell 216 configured to sense various forces on the tow bar (e.g., trailer tongue weight, tension, compression, length change, acceleration, etc.).

In the illustrated example, the sensor suite 318 generally includes a vehicle speed sensor 330, vehicle steering sensor 332, wheel speed sensors 334 (e.g., one for each wheel), accelerometer(s) 336, a throttle position sensor 338, a brake sensor 340, blind spot monitoring/cross path sensor(s) 342, ultrasonic park sensor(s) 344, one or more cameras 346 (e.g., back up, park view side, drone, etc.), and a battery charge monitoring sensor 348. However, it will be appreciated that sensor suite 318 may include any additional sensors that enable trailer system 300 to function as described herein.

With continued reference to FIGS. 8 and 9, in the example embodiment, the trailer system 300 is a self-propelled, BEV based trailer with at least one steerable axle such as, for example, the trailer systems 10, 100 described herein. In one example, trailer system 300 includes a chassis/platform 350 configured to support a class-B motor home (e.g., 21-foot length and 7-foot width). The trailer system 300 generally includes a hitch connection 352, a BEV powertrain 354, a high voltage battery system 356, and TCS 310, which includes an ADAS/autonomous driving system 358 operably connected to a sensor suite 360. The hitch connection 352 is configured to removably couple to the tow bar system 200 or directly to the lead vehicle 302. The BEV powertrain 354 includes one or more electric traction motors 360 that generate and transfer torque to one or more steerable axles 362 and wheels 364 via intermediate components (e.g., a transmission, shafts, differential, etc.). The high voltage battery system 356 is configured to power the BEV powertrain 354 and electrically couple to the lead vehicle 302, for example, via the high voltage connection 320.

As shown in FIG. 9, in the example embodiment, the ADAS/autonomous driving system 358 includes a controller 370 in signal communication with the sensor suite 360, for example via a CAN bus 371. The ADAS/autonomous driving system 358, which integrates with or is part of TCS 310, includes steer-by-wire, throttle-by-wire, and brake-by-wire modules (not shown) or functionality. The ADAS/autonomous driving system 358 is further in signal communication with the tow bar system 200 and/or lead vehicle 302 (e.g., ADAS/autonomous driving system 316) via the wired or wireless connection 326. In this way, TCS 310 is configured to receive signals from the lead vehicle 302 and/or tow bar system 200 indicating system conditions such as, for example, lead vehicle steering, throttle position, wheel speed, relative angular positioning, etc.

In the illustrated example, the sensor suite 360 generally includes a trailer speed sensor 372, a trailer steering sensor 374, wheel speed sensors 376 (e.g., one for each wheel), accelerometer(s) 378, a brake sensor 380, blind spot monitoring/cross path sensor(s) 382, ultrasonic park sensor(s) 384, one or more cameras 386 (e.g., back up, park view side, drone, etc.), and a battery charge monitoring sensor 388.

However, it will be appreciated that sensor suite 360 may include any suitable sensor that enables trailer system 300 to function as described herein.

As previously described, the trailer system 300 includes the TCS 310, which is configured to automatically perform various trailering maneuvers based on one or more signals from the trailer system 300, lead vehicle 302, and/or tow bar system 200. Such signals, for example, are received from the trailer ADAS/autonomous driving system 358, the lead vehicle ADAS/autonomous driving system 316, and/or tow bar system 200. Accordingly, TCS 310 may include one or more controllers, such as controller 370, to receive the one or more signals and execute one or more algorithms to provide the desired trailering maneuver. In the example embodiment, TCS 310 is configured to perform one or more forward maneuvers including:

(i) A delayed entry into a tight corner. This maneuver is performed by delaying the steering turn of the trailer 300 until it has traveled a determined distance into a turn to avoid clipping an inside curb or other obstacle.

(ii) A preemptive outside staging in a corner. This maneuver is performed by steering the trailer 300 toward an outside of the lead vehicle's path for a turn as it approaches an intersection and maintaining that outside track through the duration of the turn.

(iii) A real-time adjustment of the trailer's path through a corner. This maneuver is configured to avoid obstacles that appear during the turn (e.g., curbs, signs, pedestrians, oncoming traffic, etc.) based on signals from the ADAS/autonomous driving system 316 and/or 358.

(iv) Driver warning. This maneuver warns a driver of the lead vehicle 302 of an impending jackknife condition where a turn is about to exceed a maximum turn angle of the trailer 300. Example warnings include performing "soft stops" (e.g., counter-steering) in the electronic power steering system to provide tactile feedback to the driver indicating they have reached a maximum turning angle for the particular trailer.

(v) Sustained horizontal/parallel offset. This maneuver is configured to horizontally offset the trailer 300 from the lead vehicle 302 on a parallel path, for example, to optimize driving performance in a crosswind by allowing the smaller and more aerodynamically efficient lead vehicle 302 to block crosswinds from hitting the trailer 300, or to improve driver visibility behind the lead vehicle 302. The maneuver may be performed in urban environments to assist an inexperienced driver to keep the trailer in the center of the lane (e.g., while the lead vehicle 302 drives closer to the shoulder). Such maneuvers may be selected by the user or may be engaged automatically.

Additionally, in the example embodiment, TCS 310 is configured to perform one or more reversing maneuvers including:

(i) Straight line reversing led by the trailer. This maneuver includes providing steering corrections which are initiated by the trailer steering axle(s), thereby obviating the need for the lead vehicle 302 to make steering corrections via double reverse steering.

(ii) Backing turns initiated by the trailer. This maneuver enables the lead vehicle 302 to remain in its own lane, thereby obviating the need for the lead vehicle 302 to initiate the turn via double reverse steering and swinging wide outside of the turn center.

(iii) Driver warning. This maneuver warns a driver of the lead vehicle 302 of an impending jackknife condition where a turn is about to exceed a maximum turn angle of the trailer 300. Example warnings include performing "soft stops" (e.g., counter-steering) in the electronic power steering system to provide tactile feedback to the driver indicating they have reached a maximum turning angle for the particular trailer.

(iv) Jackknife condition safe exit. This maneuver automatically prevents an impending jackknife condition based on lead vehicle and trailer system steering inputs.

(v) Sustained horizontal offset. This maneuver is configured to horizontally offset the trailer 300 from the lead vehicle 302, for example, to improve driver visibility when entering parking spaces, approaching boat ramps, etc.

Figure 10:
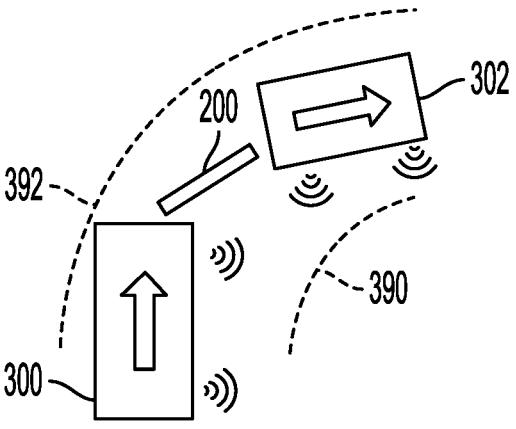
FIG. 10 is a schematic illustration of an example maneuver of the trailer control system in accordance with the principles of the present application.

FIG. 10 illustrates an example forward maneuver by TCS 310 that includes a powered trailer delayed corner entry, obstacle detection, and powered trailer pre-counter-steer. As illustrated, the trailer system 300 is attached to the lead vehicle 302 via a tether such as tow bar system 200, to perform a forward turn within a predefined inner turning boundary 390 and outer turning boundary 392. As the vehicles approach the turn, TCS 310 maintains the trailer 300 straight behind the lead vehicle 302 (or other desired orientation) based on signal(s) from the tow bar system angle sensors 218, 230. The TCS 310 controls the trailer BEV powertrain 354 to match the speed of the lead vehicle, for example, based on length sensing signals from the tow bar system load cell 216. The TCS 310 is alerted to lead vehicle turn entry, for example, via lead vehicle turn signals. The lead vehicle ADAS/autonomous driving system 316 scans the turn area for obstacles and location of lanes, and the trailer ADAS/autonomous driving system 358 verifies the information with its own sensor suite 360. The TCS 310 then steers the trailer 300 into an outside position of the turn (e.g., toward outer turning boundary 392) without exiting the lane of travel.

As the vehicles make the turn, the lead vehicle driver applies normal steering and throttle inputs as if making the turn without the trailer 300. The lead vehicle throttle, wheel, speed, and steering angle signals are monitored and relayed to the TCS 310 via communications connection 326. The TCS 310 utilizes the trailer steer-by-wire system to calculate turn radius and steers trailer 300 deeper into the turn (e.g., toward outer turning boundary 392) before beginning to turn the trailer 300 for optimal following the of the lead vehicle path. The lead vehicle ADAS/autonomous driving system 316 monitors the area inside/outside the turn for obstacles, for example, via the blind spot monitoring/cross path sensors 342, ultrasonic park sensors 344, and cameras 346. The TCS 310 verifies the lead vehicle ADAS/autonomous data via the trailer ADAS/autonomous driving system 358 and makes adjustments to the trailer turning path if necessary to avoid obstacles.

As the vehicles exit the turn, TCS 310 steers the trailer 300 back in line behind the lead vehicle 302 (or in a desired orientation). The TCS 310 then controls the trailer BEV powertrain 354 to match the speed of the lead vehicle, for example, based on length sensing signals from the tow bar system load cell 216.

Figure 11A:
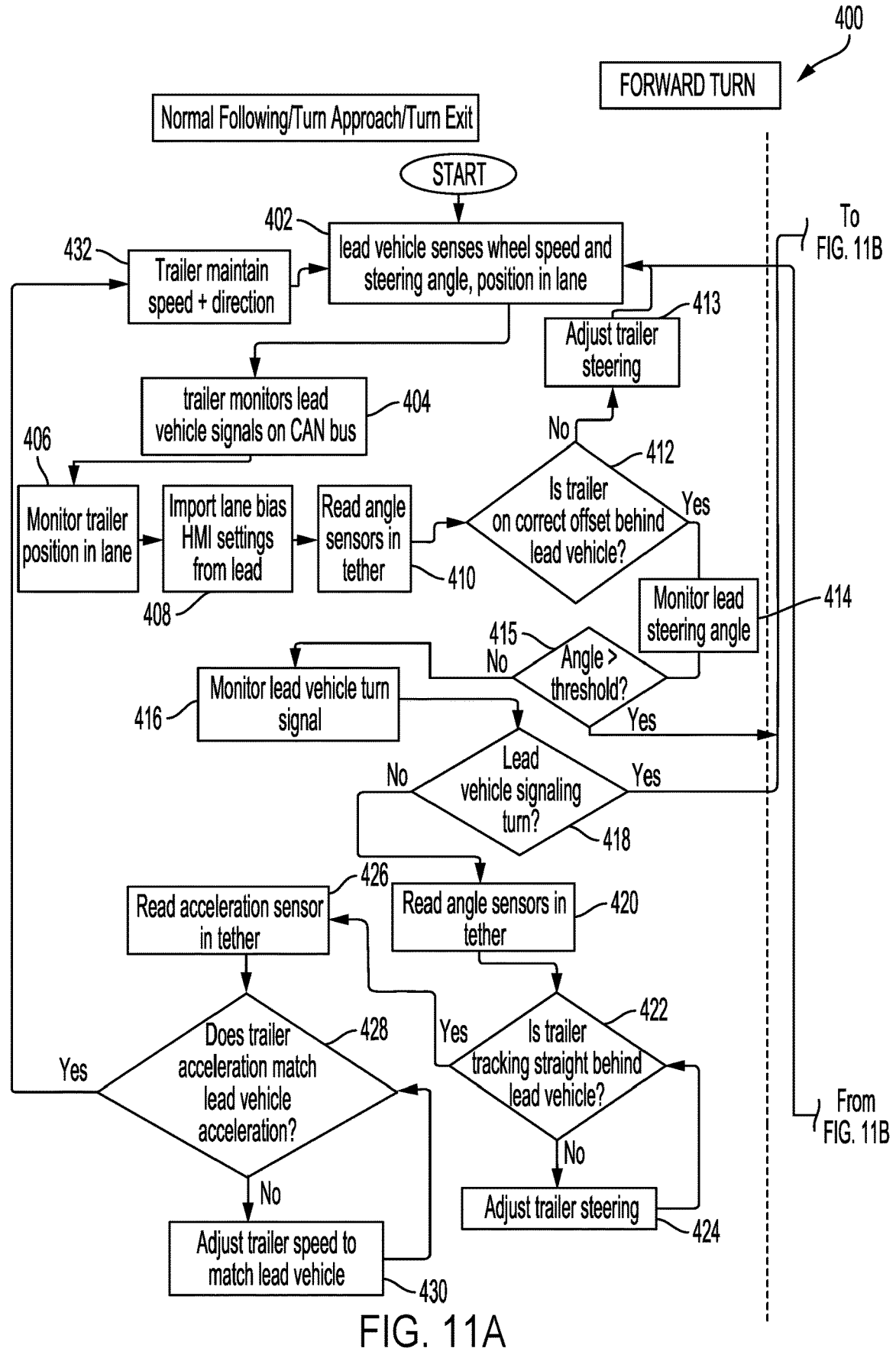
FIGS. 11A-11B illustrate a flow diagram of an example method of controlling a self-powered trailer in accordance with the principles of the present application.
Figure 11B:
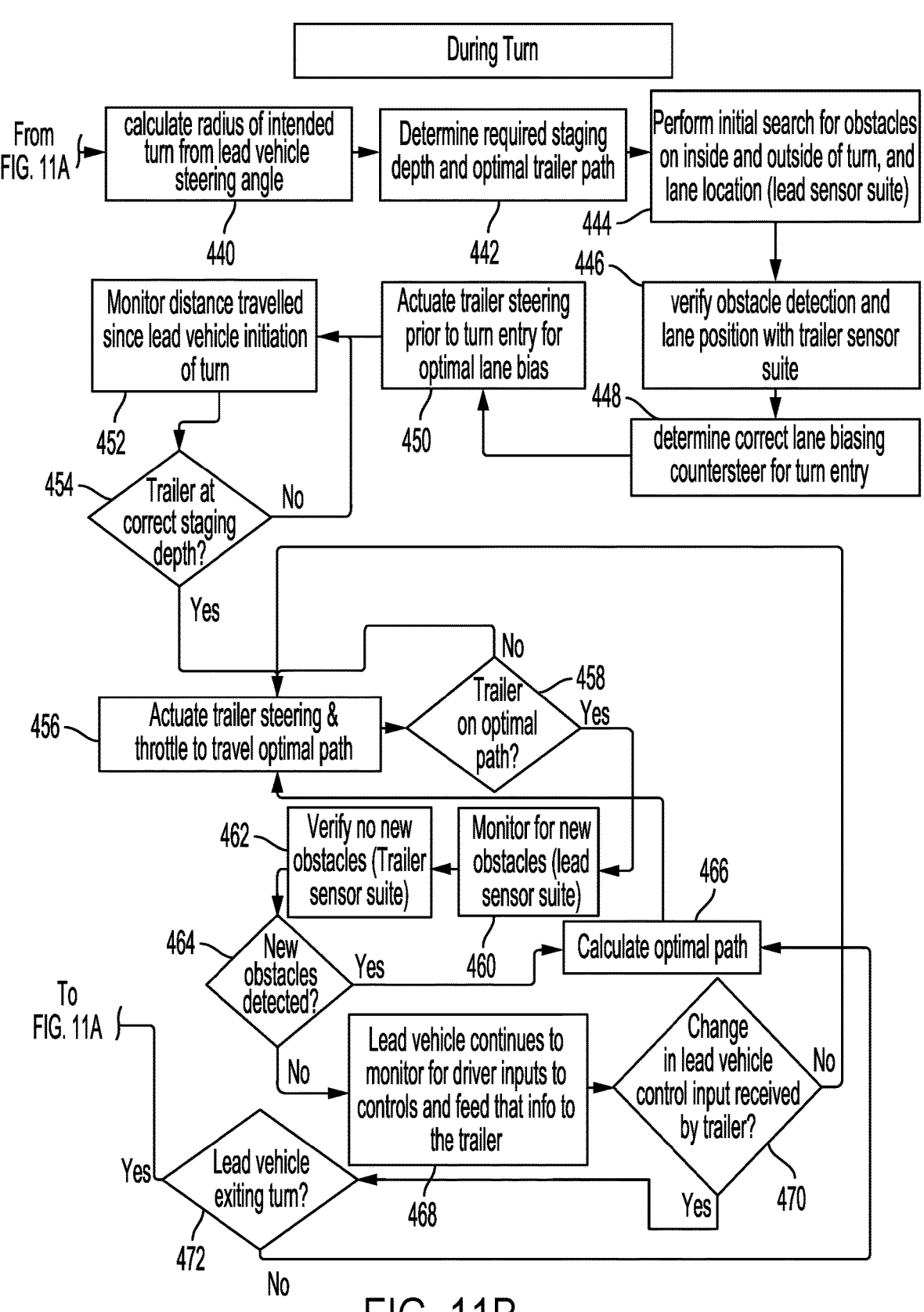

FIGS. 11A-11B illustrate an example method 400 of performing a forward turning maneuver with the trailer system 300. The method 400 begins at step 402 where the lead vehicle 302 monitors sensor suite 318 to determine lead vehicle wheel speed, steering angle, and vehicle lane position. At step 404, TCS 310 monitors lead vehicle signals on CAN bus 324 via communications connection 326. At step 406, TCS 310 utilizes sensor suite 360 to monitor trailer lane position. At step 408, TCS 310 imports any lane biasing settings from the lead vehicle 302 (e.g., via human machine interface). At step 410, TCS 310 receives signals from tow bar system angle sensors 218, 230. At step 412, TCS 310 determines if the trailer 300 is in the correct position (e.g., in-line, offset, etc.) based on the data from steps 406-410. If no, at step 413, TCS 310 adjusts the trailer steering and control returns to step 402. If yes, control proceeds to step 414.

At step 414, TCS 310 monitors the lead vehicle steering angle. At step 415, TCS 310 determines if the monitored lead vehicle steering angle exceeds a predetermined angle. In one example, this predetermined angle is indicative of an angle where the trailer 300 could potentially be at risk of colliding with one or more obstacles on the inside of the turn 390. If the monitored lead vehicle steering angle exceeds the predetermined angle, control proceeds to step 440 (FIG. 11B). If no, control proceeds to step 416.

At step 416, TCS 310 monitors lead vehicle turn signals. At step 418, TCS 310 determines if lead vehicle 302 is signaling a turn. If yes, control proceeds to step 440 (see FIG. 11B). If no, the trailer 300 should continue to track straight behind the lead vehicle and, at step 420, TCS 310 monitors tow bar system angle sensors 218, 230. At step 422, TCS 310 determines if trailer 300 is tracking straight behind the lead vehicle 302 (e.g., within a predefined tolerance). If no, at step 424, TCS 310 adjusts trailer steering and control returns to step 422. If yes, control proceeds to step 426 and TCS 310 monitors tow bar sensor 216 acceleration signals. At step 428, TCS 310 determines if trailer acceleration matches lead vehicle acceleration (e.g., within a predefined tolerance). If no, at step 430, TCS 310 adjusts trailer speed to match the lead vehicle 302 and control returns to step 428. If yes, at step 432, TCS 310 maintains trailer speed and direction and control returns to step 402.

With reference now to FIG. 11B, when control proceeds to step 440, TCS 310 determines a radius of the intended turn based on signals from the lead vehicle sensor suite 318 (e.g., lead vehicle steering sensor 332). At step 442, TCS 310 determines a staging depth and optimal path of trailer 300 such as, for example, a path for the front wheels of the trailer 300 to follow that maintains front and rear bumpers of the trailer as close to the envelope of travel established by the lead vehicle 302 as possible. At step 444, TCS 310 performs an initial search for obstacles on the inside and outside of the turn, as well determines lead vehicle and/or trailer lane location based on signals from the lead vehicle sensor suite 318. At step 446, TCS 310 verifies obstacle detection and lane position with the trailer sensor suite 360.

At step 448, TCS 310 determines a correct biasing countersteer for turn entry, which, for example, moves the trailer 300 toward one side of the lane of travel or the other, opposite the direction of the turn if one is signaled. If the lead vehicle 302 has signaled that a turn is incoming, the trailer 300 will attempt to move away from the center point of that turn in order to avoid cutting inside it. At step 450, TCS 310 actuates trailer steering prior to turn entry for optimal lane bias/position. At step 452, TCS 310 monitors distance travelled of both the trailer 300 and lead vehicle 302 since the lead vehicle turn was initiated. At step 454, TCS 310 determines if trailer 300 is at the correct staging depth to initiate its own turn. If no, control returns to step 452. If yes, control proceeds to step 456 and TCS 310 actuates trailer steering and throttle to travel the predefined optimal path. At step 458, TCS 310 determines if trailer 300 is on the optimal path. If no, control returns to step 456. If yes, control proceeds to step 460.

At step 460, TCS 310 monitors for newly detected obstacles based on signals from the lead vehicle sensor suite 318. At step 462, TCS 310 verifies lead vehicle obstacle detection with trailer sensor suite 360. At step 464, TCS 310 determines if a new obstacle is detected based on steps 460-462. If yes, at step 466, TCS 310 determines a new optimal trailer path based on the new obstacles, and then returns to step 456. If no, at step 468, TCS 310 continues to monitor lead vehicle sensor suite 318 for new driver inputs (e.g., new steering angle). At step 470, TCS 310 determines if there is a change in lead vehicle control input. If no, control returns to step 456. If yes, control proceeds to step 472, and TCS 310 determines if lead vehicle 302 is exiting the turn (e.g., completing the turn). If no, control returns to step 466. If yes, control returns to step 402.

Figure 12:
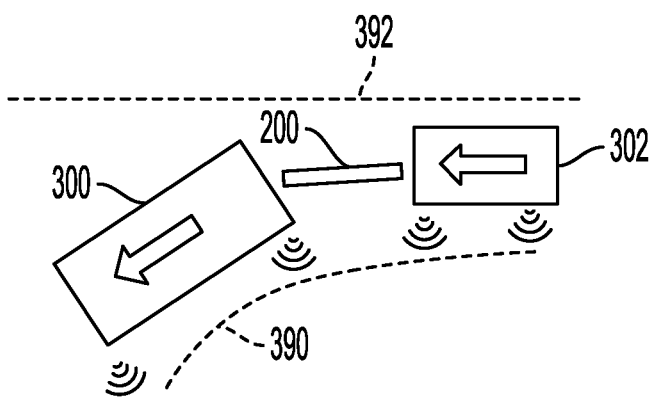
FIG. 12 is a schematic illustration of another example maneuver of the trailer control system in accordance with the principles of the present application.

FIG. 12 illustrates an example reverse turn maneuver by TCS 310 of the trailer system 300 within a predefined inner turning boundary 390 and outer turning boundary 392. As the vehicles approach the turn, the lead vehicle driver makes steering and throttle inputs as if turning without trailer 300. TCS 310 receives lead driver inputs from lead vehicle sensor suite 318, such as steer, brake, and throttle-by-wire inputs. The TCS 310 then actuates the trailer steering to initiate the turn. The lead vehicle 302 remains straight until a turn entry point, which is determined by the TCS 310, is reached. The TCS 310 also monitors the trailer sensor suite 360 to detect obstacles in the turn path.

As the vehicles make the turn, the lead driver continues to apply normal steering and throttle inputs as if making the turn without trailer 300. TCS 310 then interfaces with the lead vehicle 302 to control lead vehicle throttle and steering to follow the trailer path around the turn. The TCS 310 continues to monitor for new obstacles utilizing the trailer sensor suite 360, the lead vehicle sensor suite 318 verifies the trailer sensor data, and TCS 310 makes adjustments to the trailer turning path if necessary to avoid obstacles.

As the vehicles exit the turn and trailer 300 reaches the end of turn, the lead vehicle driver straightens the steering wheel and continues to apply the throttle. TCS 310 then straightens the trailer wheels and the lead vehicle 302 remains turned to finish the corner. TCS 310 monitors the tow bar system angle sensors 218, 230 to determine when the lead vehicle 302 has finished turning, and subsequently commands the lead vehicle's wheels to straighten out.

Figure 13A:
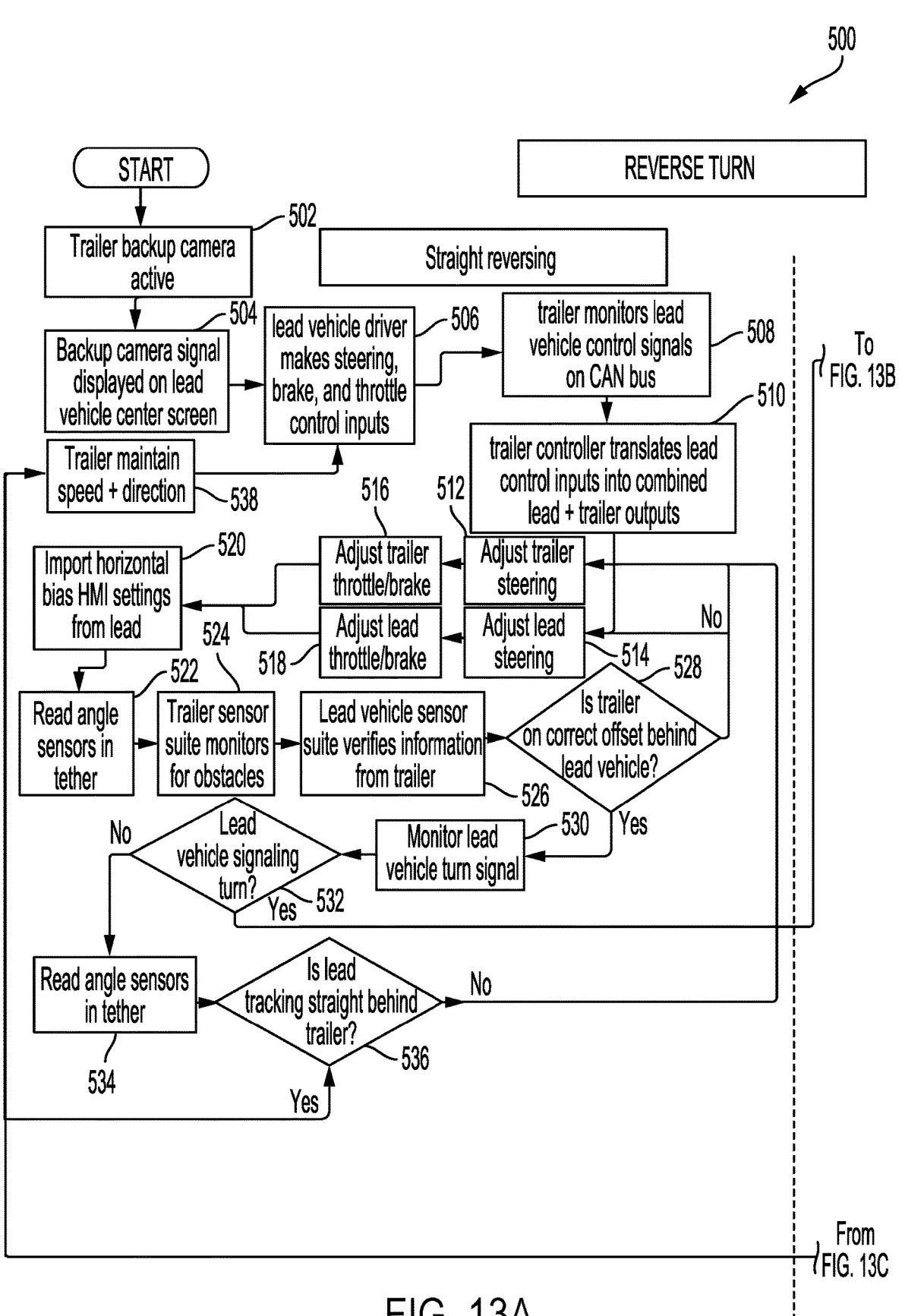
FIGS. 13A-13C illustrate a flow diagram of another example method of controlling a self-powered trailer in accordance with the principles of the present application.
Figure 13B:
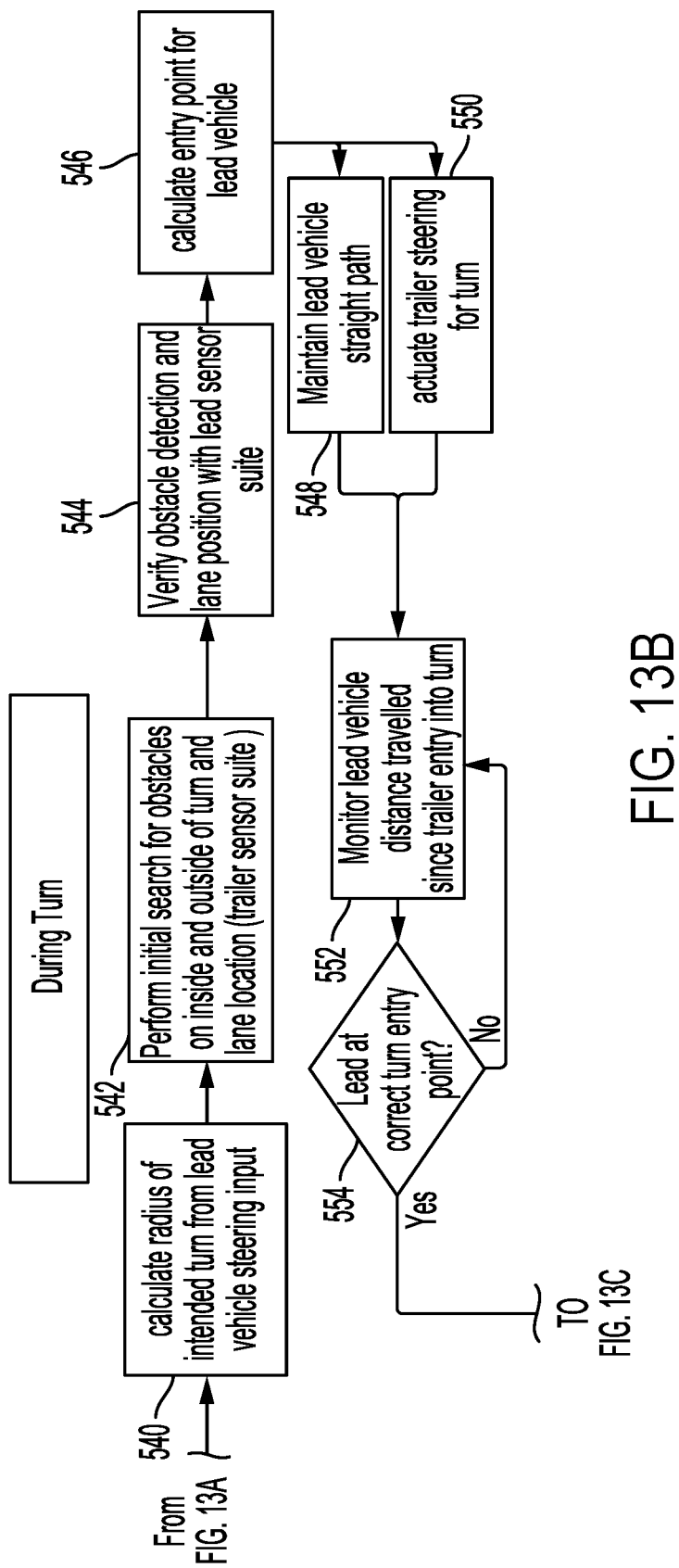
Figure 13C:
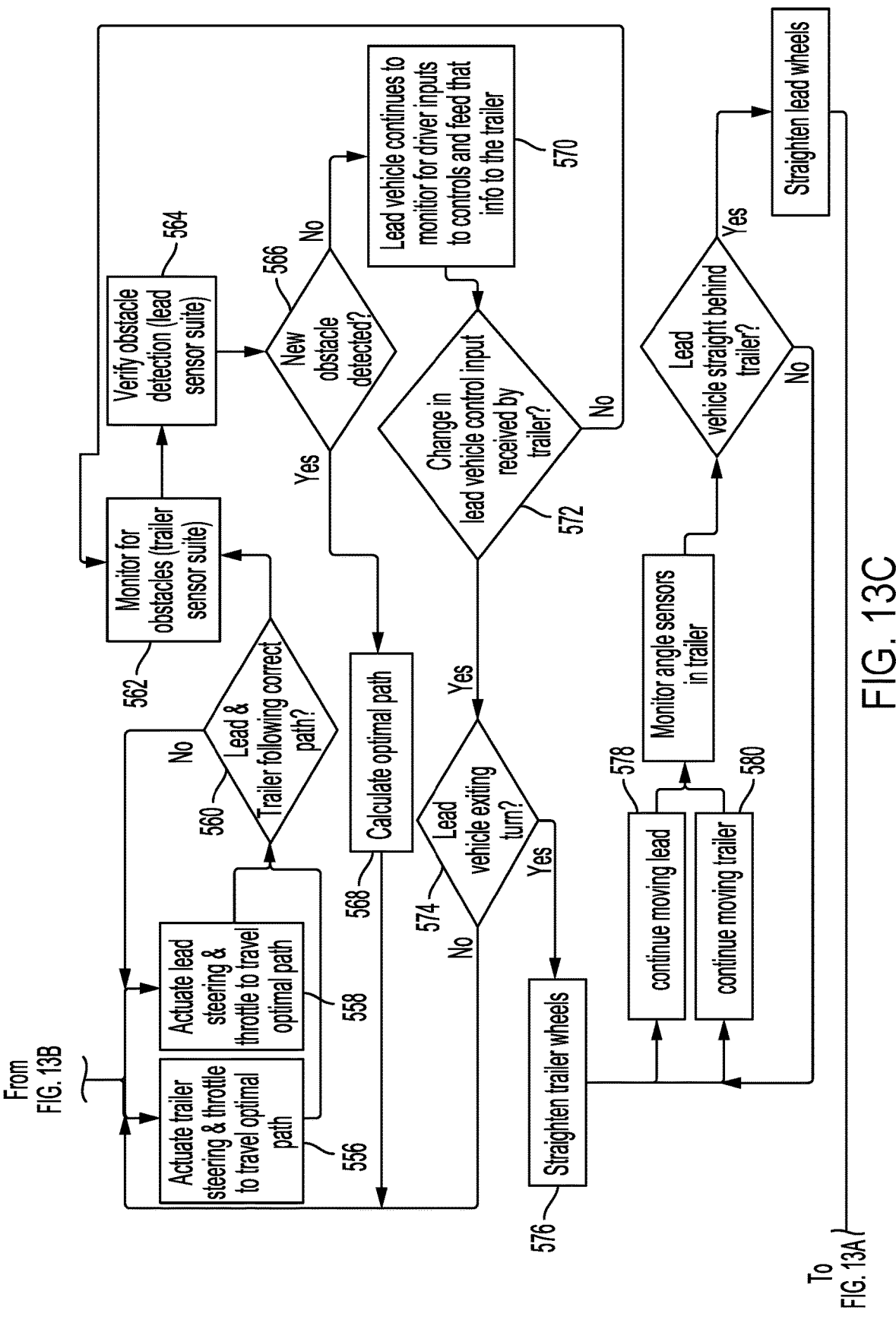

FIGS. 13A-13C illustrate an example method 500 of performing a reverse turning maneuver with trailer system 300. The method 500 begins at step 502 and TCS 310 activates camera(s) 386 (e.g., back up camera). At step 504, TCS 310 sends the camera signals to a display (not shown) in the lead vehicle 302. At step 506, the driver of the lead vehicle 302 makes steering, brake, and throttle control inputs. At step 508, TCS 310 monitors the input signals from the lead vehicle 302 via sensor suite 318.

At step 510, TCS 310 receives the lead vehicle control inputs and determines combined lead and trailer outputs. For example, upon command of a turn from the lead vehicle, the trailer 300 turns its wheels to initiate the turn while the wheels of the lead vehicle 302 remain straight. The two vehicles 300, 302 reverse at the same rate, with the trailer 300 beginning to swing around the turn with the lead vehicle 302 moving straight backwards. Then, at a point where the lead vehicle 302 is at the location where the trailer 300 began to turn, the lead vehicle 302 turns its own wheels, thus following the path of the trailer 300 around the corner. Exiting the corner happens in a similar manner, with the trailer 300 performing the maneuver first and the lead vehicle 302 imitating that maneuver when it passes the point that the trailer 300 started the maneuver.

At steps 512 and 514, TCS 310 respectively adjusts the trailer steering and lead vehicle steering, for example as described in step 510. In on example, TCS 310 determines the angle of both the trailer and lead vehicle wheels and the distance traveled by the trailer 300 and lead vehicle 302 to determine when to turn the lead vehicle wheels. At steps 516 and 518, TCS 310 respectively adjusts the trailer throttle/brake and lead vehicle throttle/brake. After any trailer/lead vehicle driving adjustments, at step 520, TCS 310 imports any trailer positioning settings from the lead vehicle 302 (e.g., HMI settings for horizontal/parallel offset).

At step 522, TCS 310 monitors tow bar system angle sensors 218, 230. At step 524, TCS 310 monitors for obstacles on the inside and outside of the turn, for example, via the trailer sensor suite 360. At step 526, TCS 310 verifies obstacle detection with the lead vehicle sensor suite 318. At step 528, TCS 310 determines if the trailer 300 is in the correct position (e.g., in-line, offset, etc.) based on the data from steps 512-526. If no, control returns to steps 512, 514. If yes, control proceeds to step 530 and TCS 310 monitors lead vehicle turn signals (or other feature indicating an impending turn).

At step 532, TCS 310 determines if the lead vehicle is signaling a turn. If yes, control proceeds to step 540 (FIG. 13B). If no, at step 534, TCS 310 continues to monitor the tow bar system angle sensors 218, 230. At step 536, TCS 310 determines if the lead vehicle 302 is tracking straight behind the trailer 300 (or other desired orientation). If no, control returns to steps 512, 514. If yes, at step 538, TCS 310 maintains trailer speed and direction and control returns to step 506.

With reference now to FIG. 13B, if at step 532 the lead vehicle 302 is signaling a turn, control proceeds to step 540 where TCS 310 determines a radius of the intended turn based on signals from the lead vehicle sensor suite 318 (e.g., lead vehicle steering sensor 332). At step 542, TCS 310 performs an initial search for obstacles on the inside and outside of the turn, as well as determines lead vehicle and/or trailer lane location based on signals from the trailer sensor suite 360. At step 544, TCS 310 verifies obstacle detection and lane position with the lead vehicle sensor suite 318. At step 546, TCS 310 determines a turn entry point for the lead vehicle 302, for example, by determining how far the lead vehicle 302 needs to travel in the original lane of travel before reaching the point where the trailer 300 initiated its turn. At this point, the lead vehicle 302 will begins its own turn to follow the path of the trailer 300. At steps 548 and 550, TCS 310 respectively maintains the lead vehicle 302 on a straight path and actuates trailer steering for the turn. At step 552, TCS 310 monitors the lead vehicle distance travelled since trailer entry into the turn. At step 554, TCS 310 determines if the lead vehicle 302 is at the correct turn entry point (e.g., via sensor suites 318, 360). If no, control returns to step 552. If yes, control proceeds to steps 556 and 558 (FIG. 13C).

With reference now to FIG. 13C, at steps 556 and 558, TCS 310 respectively actuates the trailer steering and throttle to travel the predetermined optimal path, and actuates the lead vehicle steering and throttle to travel the predetermined optimal path. At step 560, TCS 310 determines if the trailer 300 and lead vehicle 302 are following the correct optimal path (e.g., via sensor suites 318, 360). If no, control returns to steps 556, 558. If yes, at step 562, TCS 310 continues to monitor obstacles with trailer sensor suite 360. At step 564, TCS 310 verifies the trailer obstacle detection with lead vehicle sensor suite 318.

At step 566, TCS 310 determines if a new obstacle is detected based on steps 562, 564. If yes, at step 568, TCS 310 determines a new optimal path for trailer 300 and/or lead vehicle 302 based on the new obstacles, and then returns to steps 556, 558. If no, at step 570, TCS 310 continues to monitor lead vehicle sensor suite 318 for new driver inputs (e.g., new steering angle). At step 572, TCS 310 determines if there is a change in lead vehicle control input. If no, control returns to step 562. If yes, control proceeds to step 574 and TCS 310 determines if lead vehicle 302 is exiting the turn (e.g., completing the turn). If no, control returns to step 540. If yes, at step 576, TCS 310 straightens the trailer wheels.

Control then proceeds to steps 578 and 580 where TCS 310 continues to respectively drive the lead vehicle 302 and the trailer 300. At step 582, TCS 310 continues to monitor the tow bar system angle sensors 218, 230. At step 584, TCS 310 determines if the lead vehicle 302 is straight behind the trailer 300. If no, control returns to steps 578, 580. If yes, TCS 310 straightens the lead vehicle wheels and returns to step 538 to maintain trailer speed and direction.

Figure 14:
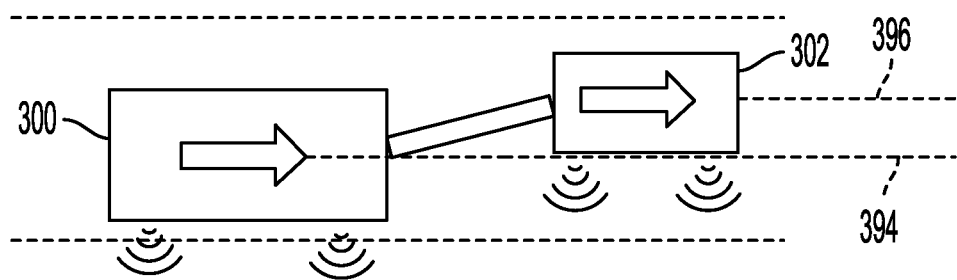
FIG. 14 is a schematic illustration of yet another example maneuver of the trailer control system in accordance with the principles of the present application.

FIG. 14 illustrates an example horizontal/parallel offset of trailer 300 and lead vehicle 302, which are coupled by a tether such as tow bar system 200. In this mode of operation, a travel path 394 of the trailer 300 is horizontally offset from and parallel to a travel path 396 of the lead vehicle 302. The driver of lead vehicle 302 may input preferences for and/or initiate the horizontal/parallel offset, for example, via a display or touch screen (not shown). TCS 310 receives various inputs from the lead vehicle 302 (e.g., via lead vehicle sensor suite 318). Example inputs include driving environment (e.g., urban, highway, etc.), obstacle sensing, lead vehicle speed, lead vehicle steering, wind direction (e.g., crosswind detection), driver preference(s), energy use preference(s) (e.g., lead vehicle energy save, trailer energy save, etc.), and battery level. The TCS 310 also receives tow bar system sensor outputs, obstacle sensing from trailer sensor suite 360, trailer steering angle, and trailer battery level. During operation, the lead vehicle driver applies normal throttle, brake, and steering inputs. The TCS 310 then determines optimal, safe trailer offset parameters, and adjusts the steering angle of the trailer 300 to maintain the horizontal/parallel offset, while monitoring signals from the tow bar system sensors.

Figure 15:
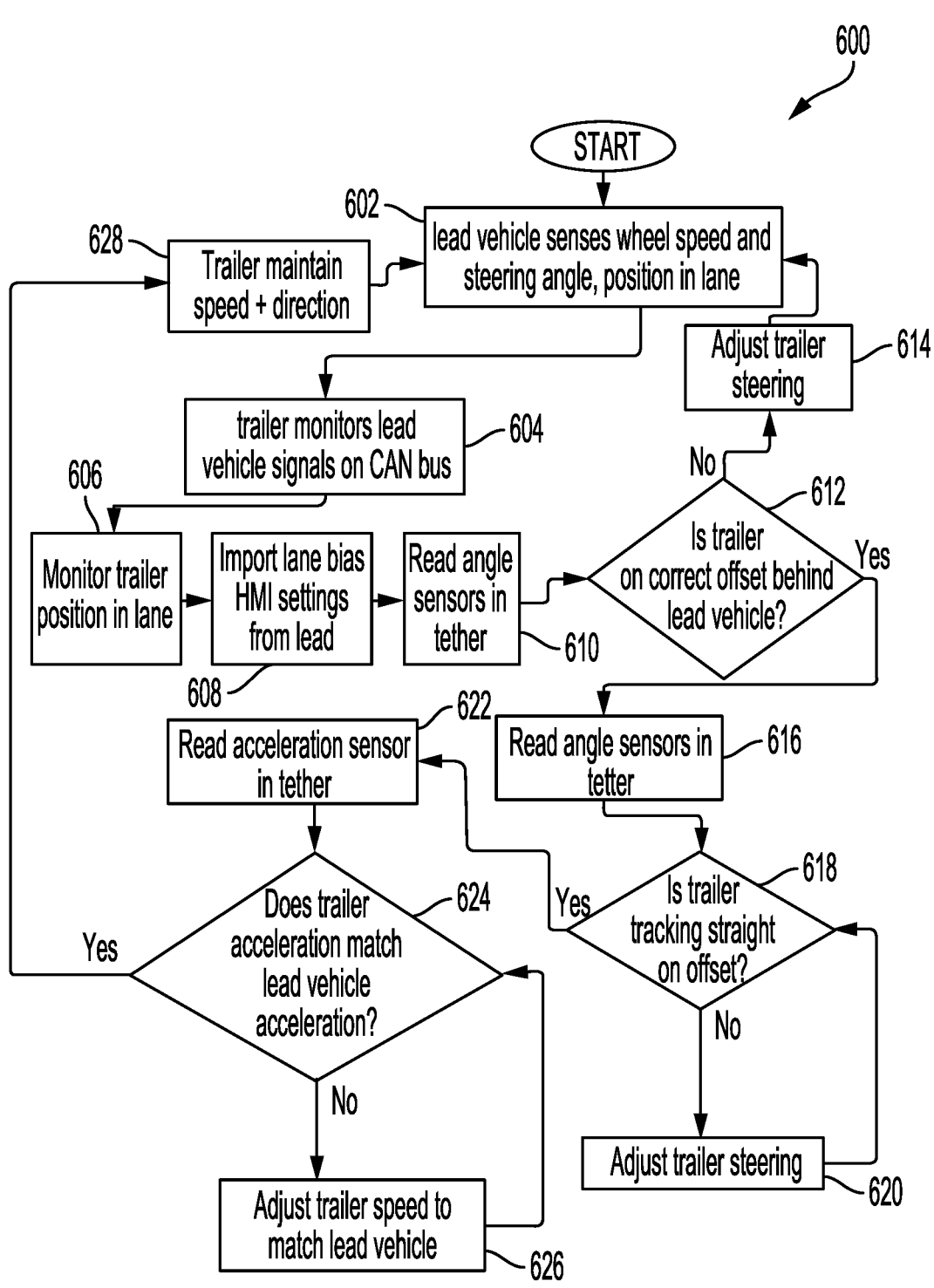
FIG. 15 illustrates a flow diagram of yet another example method of controlling a self-powered trailer in accordance with the principles of the present application.

FIG. 15 illustrates an example method 600 of performing a horizontal/parallel offset of trailer system 300 and lead vehicle 302. The method 600 begins at step 602 where the lead vehicle 302 monitors sensor suite 318 to determine lead vehicle wheel speed, steering angle, and vehicle lane position. At step 604, TCS 310 monitors lead vehicle signals on CAN bus 324 via communication connection 326. At step 606, TCS 310 utilizes sensor suite 360 to monitor trailer lane position. At step 608, TCS 310 imports any lane biasing settings from the lead vehicle 302 (e.g., via HMI). At step 610, TCS 310 receives signals from tow bar system angle sensors 218, 230. At step 612, TCS 310 determines if trailer is in the correct (e.g., desired) offset position behind the lead vehicle 302 based on data from steps 604-610. If no, at step 614, TCS 310 adjusts the trailer steering and control returns to step 602. If yes, control proceeds to step 616.

At step 616, TCS 310 monitors tow bar system angle sensors 218, 230. At step 618, TCS 310 determines if trailer 300 is tracking straight on the predefined parallel offset. In other words, determining if the trailer 300 is tracking correctly behind the lead vehicle 302, including maintaining the correct offset, if one is specified. If no, at step 620, TCS 310 adjusts trailer steering and control returns to step 618. If yes, control proceeds to step 622 and TCS 310 monitors tow bar system sensor 216 acceleration signals. At step 624, TCS 310 determines if trailer acceleration matches lead vehicle acceleration (e.g., within a predefined tolerance). If no, at step 626, TCS 310 adjusts trailer speed to match lead vehicle speed and control returns to step 624. If yes, at step 628, TCS 310 maintains trailer speed and direction and control returns to step 602.

Described herein are systems and methods for controlling a self-propelled trailer system. The trailer control system is configured to automatically assist or completely control various towing maneuvers to improve a driver towing experience. In some examples, the trailer control system integrates with lead vehicle ADAS/autonomous driving systems and a sensor-equipped trailer tether to provide additional operational capability. As such, the trailer control system receives information from multiple sources to automatically drive, brake, and steer the trailer system while dynamically responding to the vehicle environment, to thereby enhance towing and driving safety.

It will be appreciated that the term "controller" or "module" as used herein refers to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. A trailer system with independent propulsion and control configured to be towed by a lead vehicle, the trailer system comprising:

a steerable first axle connected to a pair of first wheels;

a second axle connected to a pair of second wheels;

at least one electric traction motor configured to drive the steerable first axle;

a high voltage battery system configured to power the at least one electric traction motor;

a trailer control system (TCS) including a controller, having a processor and a non-transitory computer-readable storage medium, configured to steer, accelerate, and brake the first and/or second wheels; and a trailer sensor suite in signal communication with the TCS, wherein the TCS is configured for signal communication with a lead vehicle sensor suite, wherein the TCS is configured to control driving and/or operation of the trailer system based on one or more signals from the trailer sensor suite and the lead vehicle sensor suite, wherein the TCS is programmed to perform a forward driving maneuver of the trailer system, comprising:

monitoring, by the controller, the lead vehicle sensor suite to determine a lead vehicle wheel speed, steering angle, and vehicle lane position;

monitoring, by the controller, the trailer sensor suite to determine a trailer system wheel speed, steering angle, and trailer system lane position; and maintaining, by the controller, a speed and direction of the trailer system to match a forward driving maneuver of the lead vehicle; and wherein the TCS is programmed to perform a parallel offset maneuver, comprising:

receiving, by the controller, lane biasing settings from the lead vehicle for a sustained parallel offset of the trailer system; and steering, by the controller, the trailer system into a travel path that is horizontally offset from and parallel to a travel path of the lead vehicle, based on the lane biasing settings.

2. The trailer system of claim 1, wherein the TCS includes an advanced driver assistance system (ADAS) or autonomous driving system.

3. The trailer system of claim 1, further comprising an extendable tow bar system to couple the trailer system to the lead vehicle, wherein the tow bar system includes:

a front tow bar configured to removably couple to a hitch of the lead vehicle;

a rear tow bar configured to removably couple to a hitch of the trailer system;

a damper system disposed between the front tow bar and the rear tow bar and configured to absorb compressive and tensile loads occurring during steering, accelerating, and braking of the trailer system; and at least one angle sensor configured to sense a first angle between the lead vehicle and the tow bar system, and a second angle between the trailer system and the tow bar system, wherein the tow bar system is extendable so as to allow fore-aft movement thereof during turning maneuvers of the lead vehicle and trailer system.

4. The trailer system of claim 1, wherein the TCS is configured to perform, by the controller, a forward turning maneuver of the trailer system by steering, accelerating, and/or braking the trailer system when the lead vehicle makes a forward turn.

5. The trailer system of claim 4, wherein the forward turning maneuver includes performing a delayed entry of the trailer system into the turn, comprising:

detecting, by the controller, an impending turn of the lead vehicle based on signals from the lead vehicle sensor suite;

determining, by the controller, a radius of the impending turn;

monitoring, by the controller, the lead vehicle sensor suite and/or the trailer sensor suite to detect one or more obstacles in a path of the impending turn; and steering, by the controller, the trailer system to perform a delayed entry into the turn after the lead vehicle has initiated the forward turn, such that trailer system delays its turn until it has traveled a determined distance to avoid the one or more obstacles detected by the trailer sensor suite and/or the lead vehicle sensor suite.

6. The trailer system of claim 4, wherein the forward turning maneuver includes performing a preemptive outside staging of the trailer system, comprising:

detecting, by the controller, an impending turn of the lead vehicle based on signals from the lead vehicle sensor suite;

determining, by the controller, a turning path of the lead vehicle based on the signals from the lead vehicle sensor suite; and steering, by the controller, the trailer system to an outside of the lead vehicle's turning path as the trailer system approaches the turn and maintaining the trailer system on the outside of the lead vehicle's turning path throughout a duration of the turn.

7. The trailer system of claim 4, wherein the forward turning maneuver includes real-time adjustment of a turning path of the trailer system to avoid one or more obstacles detected during the forward turning maneuver by the trailer sensor suite and/or lead vehicle sensor suite.

8. The trailer system of claim 4, wherein during the forward turning maneuver, the TCS is configured to:

detect, by the controller and based on one or more signals from the trailer sensor suite and/or lead vehicle sensor suite, if the lead vehicle has exceeded a predetermined maximum turn angle that could result in a jackknife condition; and provide, by the controller, a warning to a driver of the lead vehicle when exceeding the predetermined maximum turn angle is detected.

9. A trailer system with independent propulsion and control configured to be towed by a lead vehicle, the trailer system comprising:

a steerable first axle connected to a pair of first wheels;

a second axle connected to a pair of second wheels;

at least one electric traction motor configured to drive the steerable first axle;

a high voltage battery system configured to power the at least one electric traction motor;

a trailer control system (TCS) including a controller, having a processor and a non-transitory computer-readable storage medium, configured to steer, accelerate, and brake the first and/or second wheels; and a trailer sensor suite in signal communication with the TCS, wherein the TCS is configured for signal communication with a lead vehicle sensor suite, wherein the TCS is configured to control driving and/or operation of the trailer system based on one or more signals from the trailer sensor suite and the lead vehicle sensor suite, wherein the TCS is programmed to perform a reverse driving maneuver of the trailer system, comprising:

activating, by the controller, one or more back up cameras of the trailer system sensor suite to provide one or more camera signals to a display in the lead vehicle;

monitoring, by the controller, the lead vehicle sensor suite to determine lead vehicle steering, brake, and throttle control inputs;

controlling, by the controller, the trailer system based on the determined lead vehicle steering, brake, and throttle control inputs; and controlling, by the controller, steering, brake, and throttle of the lead vehicle to follow a path of the trailer system.

10. The trailer system of claim 9, wherein the TCS is configured to perform, by the controller, reverse driving maneuvers via the steerable first axle and automatically controlling the lead vehicle steering to follow the trailer vehicle, thereby obviating a need for the lead vehicle driver to make steering corrections via double reverse steering.

11. The trailer system of claim 9, wherein during the reverse turning maneuver the controller is configured to control throttle and steering of the lead vehicle.

12. The trailer system of claim 9, wherein the TCS is programmed to perform a parallel offset maneuver to improve driver visibility during the reverse driving maneuver, the parallel offset maneuver comprising:

receiving, by the controller, lane biasing settings from the lead vehicle for a sustained parallel offset of the trailer system; and steering, by the controller, the trailer system into a travel path that is horizontally offset from and parallel to a reverse travel path of the lead vehicle, based on the lane biasing settings.

13. The trailer system of claim 9, wherein during a reverse turning maneuver, the TCS is configured to:

detect, by the controller and based on one or more signals from the trailer sensor suite and/or lead vehicle sensor suite, if the lead vehicle has exceeded a predetermined maximum turn angle that could result in a jackknife condition; and initiate, by the controller, when a jackknife condition is detected, a controlled turning of the trailer system and/or the lead vehicle to prevent the jackknife condition.

14. The trailer system of claim 1, wherein the trailer sensor suite comprises:

a trailer speed sensor;

a trailer steering sensor;

one or more wheel speed sensors;

an accelerometer;

a brake sensor;

one or more blind spot monitoring/cross path sensors;

one or more ultrasonic park sensors; and one or more cameras.

15. A method of controlling a trailer system with independent propulsion and control configured to be towed by a lead vehicle, the trailer system including a steerable first axle connected to a pair of first wheels, a second axle connected to a pair of second wheels, at least one electric traction motor configured to drive the steerable first axle, a high voltage battery system configured to power the at least one traction motor, a trailer control system (TCS) including a controller, having a processor and a non-transitory computer-readable storage medium, configured to steer, accelerate, and brake the first and/or second wheels, and a trailer sensor suite in signal communication with the TCS, the method comprising:

monitoring, with the controller, the trailer sensor suite;

monitoring, with the controller, a lead vehicle sensor suite; and performing, with the controller, a forward movement maneuver of the trailer system, comprising:

monitoring, by the controller, the lead vehicle sensor suite to determine a lead vehicle wheel speed, steering angle, and vehicle lane position;

monitoring, by the controller, the trailer sensor suite to determine a trailer system wheel speed, steering angle, and trailer system lane position; and maintaining, by the controller, a speed and direction of the trailer system to match a forward movement maneuver of the lead vehicle; and performing, with the controller, a parallel offset maneuver, including:

receiving, by the controller, lane biasing settings from the lead vehicle for a sustained parallel offset of the trailer system; and steering, by the controller, the trailer system into a travel path that is horizontally offset from and parallel to a travel path of the lead vehicle, based on the lane biasing settings.

16. The method of claim 15, further comprising performing a delayed entry of the trailer system into a forward turn, including:

detecting, by the controller, an impending turn of the lead vehicle based on signals from the lead vehicle sensor suite;

determining, by the controller, a radius of the impending turn;

monitoring, by the controller, the lead vehicle sensor suite and/or the trailer sensor suite to detect one or more obstacles in a path of the impending turn; and steering, by the controller, the trailer system to perform a delayed entry into the turn after the lead vehicle has initiated the forward turn, such that trailer system delays its turn until it has traveled a determined distance to avoid the one or more obstacles detected by the trailer sensor suite and/or the lead vehicle sensor suite.

17. The method of claim 15, further comprising performing a preemptive outside staging of the trailer system into a forward turn, comprising:

detecting, by the controller, an impending turn of the lead vehicle based on signals from the lead vehicle sensor suite;

determining, by the controller, a turning path of the lead vehicle based on the signals from the lead vehicle sensor suite; and steering, by the controller, the trailer system to an outside of the lead vehicle's turning path as the trailer system approaches the turn and maintaining the trailer system on the outside of the lead vehicle's turning path throughout a duration of the turn.

18. The method of claim 15, wherein the trailer system further includes an extendable tow bar system to couple the trailer system to the lead vehicle, wherein the tow bar system includes:

a front tow bar configured to removably couple to a hitch of the lead vehicle;

a rear tow bar configured to removably couple to a hitch of the trailer system;

a damper system disposed between the front tow bar and the rear tow bar and configured to absorb compressive and tensile loads occurring during steering, accelerating, and braking of the trailer system; and at least one angle sensor configured to sense a first angle between the lead vehicle and the tow bar system, and a second angle between the trailer system and the tow bar system, wherein the tow bar system is extendable so as to allow fore-aft movement thereof during turning maneuvers of the lead vehicle and trailer system, and wherein the TCS is in signal communication with the at least one angle sensor, the method further comprising:

performing, with the controller, the forward movement maneuver by steering, accelerating, and/or braking the trailer system based at least in part on one or more signals from the at least one angle sensor.

* * * * *